(12) United States Patent
Chen et al.

(10) Patent No.: US 11,709,783 B1
(45) Date of Patent: Jul. 25, 2023

(54) TENSOR DATA DISTRIBUTION USING GRID DIRECT-MEMORY ACCESS (DMA) CONTROLLER

(71) Applicant: Meta Platforms, Inc., Menlo Park, CA (US)

(72) Inventors: Xu Chen, San Jose, CA (US); Harshit Khaitan, San Jose, CA (US); Yu Hsin Chen, Santa Clara, CA (US); Liangzhen Lai, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 218 days.

(21) Appl. No.: 17/095,500

(22) Filed: Nov. 11, 2020

(51) Int. Cl.
| | | |
|---|---|---|
| *G06F 13/42* | (2006.01) | |
| *G06F 13/38* | (2006.01) | |
| *G06F 13/40* | (2006.01) | |
| *H04L 67/1097* | (2022.01) | |
| *G06F 12/1081* | (2016.01) | |
| *G06F 12/02* | (2006.01) | |
| *G06F 12/0879* | (2016.01) | |
| *G06N 20/00* | (2019.01) | |
| *G06F 9/30* | (2018.01) | |

(Continued)

(52) U.S. Cl.
CPC ........ *G06F 12/1081* (2013.01); *G06F 9/3004* (2013.01); *G06F 9/30036* (2013.01); *G06F 9/30065* (2013.01); *G06F 12/0238* (2013.01); *G06F 12/0879* (2013.01); *G06F 13/28* (2013.01); *G06F 17/16* (2013.01); *G06N 20/00* (2019.01)

(58) Field of Classification Search
None
See application file for complete search history.

(56) References Cited

U.S. PATENT DOCUMENTS

| | | |
|---|---|---|
| 9,710,265 B1 | 7/2017 | Temam |
| 9,836,691 B1 | 12/2017 | Narayanaswami |
| 10,175,980 B2 | 1/2019 | Temam |

(Continued)

OTHER PUBLICATIONS

Dettmers, Deep Learning in a Nutshell: Core Concepts, pp. 1-10, 2020.

(Continued)

*Primary Examiner* — Idriss N Alrobaye
*Assistant Examiner* — Dayton Lewis-Taylor
(74) *Attorney, Agent, or Firm* — Baker Botts L.L.P.

(57) ABSTRACT

In one embodiment, a method for tensor data distribution using a direct-memory access agent includes generating, by a first controller, source addresses indicating locations in a source memory where portions of a source tensor are stored. A second controller may generate destination addresses indicating locations in a destination memory where portions of a destination tensor are to be stored. The direct-memory access agent receives a source address generated by the first controller and a destination address generated by the second controller and determines a burst size. The direct-memory access agent may issue a read request comprising the source address and the burst size to read tensor data from the source memory and may store the tensor data into an alignment buffer. The direct-memory access agent then issues a write request comprising the destination address and the burst size to write data from the alignment buffer into the destination memory.

20 Claims, 13 Drawing Sheets

(51) Int. Cl.
    *G06F 17/16*       (2006.01)
    *G06F 13/28*       (2006.01)

(56) References Cited

U.S. PATENT DOCUMENTS

| | | |
|---|---|---|
| 10,496,326 B2 | 12/2019 | Temam |
| 10,534,607 B2 | 1/2020 | Temam |
| 10,802,956 B2 | 10/2020 | Temam |
| 2019/0205746 A1* | 7/2019 | Nurvitadhi ........... G06K 9/6256 |
| 2019/0205756 A1 | 7/2019 | Temam |
| 2020/0005128 A1 | 1/2020 | Temam |

OTHER PUBLICATIONS

Jiao, et al., High-Performance Machine Learning, 2020 IEEE, pp. 136-138, Feb. 18, 2020.

Emer, et al., DNN Accelerator Architectures, ISCA Tutorial, 70 pages, 2019.

* cited by examiner

TENSOR DATA DISTRIBUTION USING GRID DIRECT-MEMORY ACCESS (DMA) CONTROLLER

TECHNICAL FIELD

This disclosure generally relates to accelerators for machine learning models and, more particularly, to tensor data distribution using a grid direct-memory access (DMA) controller.

BACKGROUND

Neural networks are increasingly being used to implement machine learning (ML) techniques to solve a wide variety of problems including, but not limited to, object identification, feature classification, or content-driven image processing. Some neural networks, which may be referred to as convolutional neural networks, include one or more convolutional layers. In a convolutional neural network (CNN), the convolutional layers typically account for the vast majority of the computations performed and the data movement within the CNN and/or between the CNN and other elements of an ML model, making them a performance bottleneck. Therefore, existing ML accelerators focus on using high compute parallelism along with an optimized data orchestration throughout the memory hierarchy to speed up the processing of convolutional layers. However, existing ML accelerators may not perform well when implemented within edge devices that have strict power consumption constraints and that run inference exercises using previously trained models in real time. For example, existing ML accelerators may not perform well within artificial reality systems for virtual reality (VR), augmented reality (AR), mixed reality (MR), or hybrid reality implemented on standalone head-mounted displays (e.g., on AR/VR headsets), mobile devices or other edge computing devices.

SUMMARY OF PARTICULAR EMBODIMENTS

In particular embodiments, a grid direct-memory access (DMA) controller may be used, in part, to read tensor data from a source memory and write the tensor data into a destination memory in one or more data chunks, or "bursts," where addresses in the source memory and destination memory may be of arbitrary alignment in relation to one another. In particular, the grid DMA controller may be communicably coupled to a grid DMA agent used to transfer tensor data in bursts such that one or more tensor processor units may process the tensor data within a machine learning (ML) accelerator. The grid DMA controller may include a source memory controller and a destination memory controller executing in lockstep to iteratively generate addresses that indicate locations in the source memory, or "source addresses," and addresses that indicate locations in the destination memory, or "destination addresses," respectively.

The source memory controller and destination memory controller may both execute respective loop instructions (e.g., for loop, while loop, and the like) in lockstep to form an address pair comprised of a source address and destination address for each iteration of the respective loop instructions. The source memory controller may execute a loop instruction, or a "source loop instruction," that iteratively increments a base address indicating a location in the source memory, or a "source base address," where a first portion of multi-dimensional tensor data, or a "source tensor," is stored. The source base address may be iteratively incremented (e.g., using the source loop instruction) by an increment value, or a "source address increment value," for each dimension of the source tensor. Each dimension of the source tensor stored in source memory may be associated with a respective source address increment value. Similarly, the destination memory controller may execute a loop instruction, or a "destination loop instruction," that iteratively increments a base address indicating a location in the destination memory, or a "destination base address," where a first portion of multi-dimensional tensor data, or a "destination tensor," is to be stored. The destination base address may be iteratively incremented by an increment value, or a "destination address increment value," for each dimension of the destination tensor. Each dimension of the destination tensor to be stored in destination memory may be associated with a respective destination address increment value. For source address and destination address pairs that are unaligned, the grid DMA agent may temporarily store a source tensor (e.g., stored at the unaligned source address in source memory) in an alignment buffer to shift the tensor data into alignment with the corresponding destination address.

Innovative aspects of the subject matter described in this specification may be embodied in a system, a method, and computer-readable non-transitory storage media for generating, by a first controller and based on instructions for reading a source tensor from a source memory, source addresses indicating locations in the source memory where portions of the source tensor are stored; generating, by a second controller and based on instructions for writing a destination tensor into a destination memory, destination addresses indicating locations in the destination memory where portions of the destination tensor are to be stored; receiving, by a direct-memory access agent, a source address generated by the first controller and a destination address generated by the second controller; determining, by the direct-memory access agent, a burst size; issuing, by the direct-memory access agent, a read request comprising the source address and the burst size to read tensor data from the source memory; storing, by the direct-memory access agent, the tensor data into an alignment buffer; and issuing, by the direct-memory access agent, a write request comprising the destination address and the burst size to write data from the alignment buffer into the destination memory.

In one or more of the disclosed embodiments, the instructions for reading the source tensor from the source memory include: a source loop instruction to be executed by the first controller, the source loop instruction causing the first controller to iteratively generate the source addresses; a source base address indicating a location in the source memory where a first portion of the source tensor is stored; and one or more source address increment values, each of the one or more source address increment values associated with a dimension of one or more dimensions comprising the source tensor.

In one or more of the disclosed embodiments, generating the source addresses comprises: receiving, by the first controller, the instructions for reading the source tensor from the source memory; and incrementing, using the source loop instruction, the source base address by the one or more address increment values for each dimension of the one or more dimensions.

In one or more of the disclosed embodiments, the instructions for writing the destination tensor into the destination memory include: a destination loop instruction to be executed by the second controller, the destination loop instruction causing the second controller to iteratively generate the destination addresses; a destination base address indicating a location in the destination memory where a first portion of the destination tensor is to be stored; and one or more destination address increment values, each of the one or more destination address increment values associated with a dimension of one or more dimensions comprising the destination tensor.

In one or more of the disclosed embodiments, generating the destination addresses comprises: receiving, by the second controller, the instructions for writing the destination tensor into the destination memory; and incrementing, using the destination loop instruction, the destination base address by the one or more address increment values for each dimension of the one or more dimensions.

In one or more of the disclosed embodiments, issuing the write request comprising the destination address and the burst size to write data from the alignment buffer into the destination memory comprises: shifting, by the direct-memory access agent, the data in the alignment buffer to align with the destination address; and transmitting, by the direct-memory access agent, the data from the alignment buffer to the destination memory in one or more burst transmissions according to the burst size.

The embodiments disclosed herein are only examples, and the scope of this disclosure is not limited to them. Particular embodiments may include all, some, or none of the components, elements, functions, operations, or steps of the embodiments disclosed above. Embodiments according to the invention are in particular disclosed in the attached claims directed to a method, a storage medium, a system and a computer program product, wherein any element mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the elements thereof are disclosed and can be claimed regardless of the dependencies chosen in the attached claims. The subject-matter which can be claimed comprises not only the combinations of elements as set out in the attached claims but also any other combination of elements in the claims, wherein each element mentioned in the claims can be combined with any other element or combination of other elements in the claims. Furthermore, any of the embodiments and elements thereof described or depicted herein can be claimed in a separate claim and/or in any combination with any embodiment or element described or depicted herein or with any of the elements of the attached claims.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

DESCRIPTION OF EXAMPLE EMBODIMENTS

Before discussing the present embodiments in detail, it may be beneficial to first provide some background information regarding neural networks and machine learning (ML) models in general. A neural network, or neural net, is a nodal network of interconnected neurons, where each neuron represents a node in the network. Groups of neurons may be arranged in layers, with the outputs of one layer feeding forward to a next layer in a multilayer perception (MLP) arrangement. MLP may be understood to be a feedforward neural network model that maps a set of input data onto a set of output data.

Figure 1:
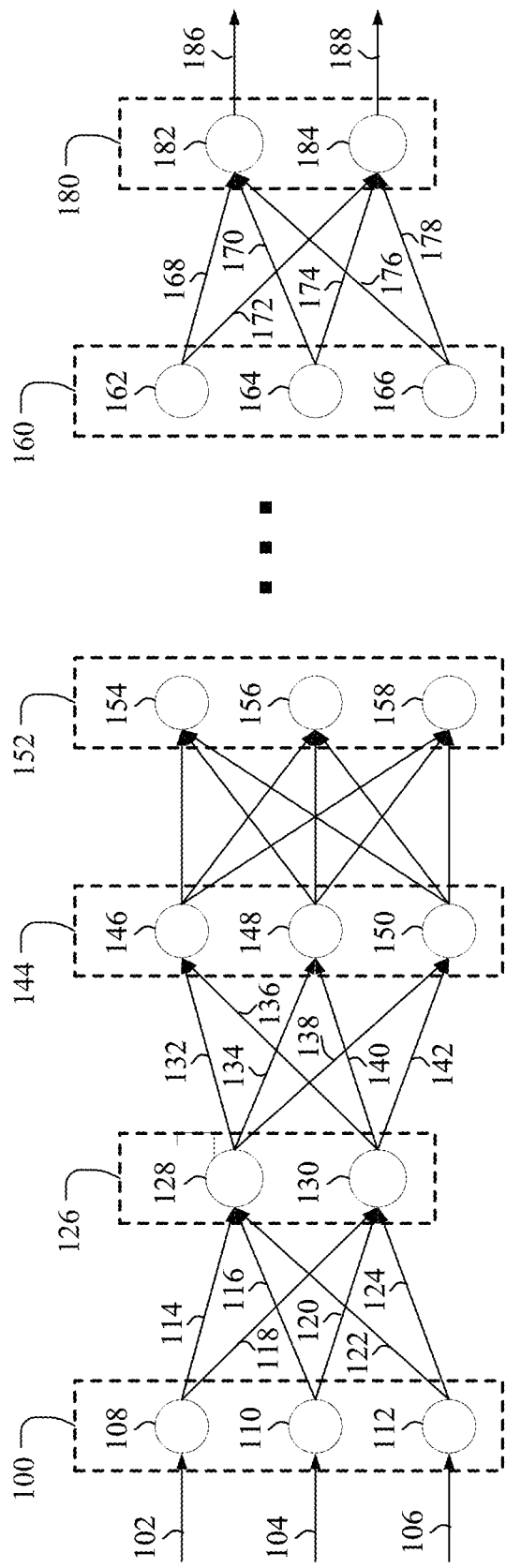
FIG. 1 illustrates selected elements of an example of a multilayer perception (MLP) neural network.

FIG. 1 illustrates selected elements of an example of a multilayer perception neural network, in accordance with particular embodiments. Its structure may include multiple hidden, e.g., internal, layers that map an input layer 100 that receives a set of inputs or a vector input to an output layer 180 that includes a set of outputs or a vector output. Each layer may include any given number of nodes, which are herein illustratively shown as circles within each layer. For example, input layer 100 includes three nodes, shown as nodes 108 110, and 112, and output layer 180 includes two nodes, shown as 182 and 184. The example neural network illustrated in FIG. 1 includes at least four hidden layers but may include additional hidden layers not shown in FIG. 1. In the illustrated example, the first hidden layer 126 includes two nodes, shown as nodes 128 and 130, while hidden layers 144, 152, and 160 each include three nodes, shown as nodes 146, 148, and 150, nodes 154, 156, and 158, and nodes 162, 164, and 166, respectively. Generally, the deeper the MLP (e.g., the greater the number of hidden layers in the MLP), the greater its capacity to learn. The input layer 100 receives a vector input, illustratively shown as a three-dimensional vector consisting of inputs 102, 104 and 106, and may apply the received vector input to the first hidden layer 126 in the sequence of hidden layers. The output layer 180 receives the output from the last hidden layer in the multilayer model, e.g., 160, processes its inputs, and produces a vector output result, illustratively shown as a two-dimensional vector consisting of outputs 186 and 188.

Typically, each neuron (or node) produces a single output that is fed forward to neurons in the layer immediately following it. However, each neuron in a hidden layer may receive multiple inputs, either from the input layer or from the outputs of neurons in a preceding hidden layer, such as the immediately preceding hidden layer or an earlier hidden layer. In general, each node may apply a function to its inputs to produce an output for that node. Nodes in hidden layers, including layers referred to as learning layers, may apply the same function or a different function to their respective input(s) to produce their respective output(s). Some nodes, however, such as the nodes in the input layer 100 may receive only one input and may be passive, meaning that each node may simply relay the value of its single input to its output(s) thus providing a copy of the input to the output(s).

In the example neural network illustrated in FIG. 1, the outputs of nodes 108, 110, and 112 of input layer 100 feed forward as inputs to hidden layer 126, which includes nodes 128 and 130. The outputs of nodes 128 and 130, in turn, feed forward as inputs to hidden layer 144, which includes nodes 146, 148, and 150, the outputs of nodes 146, 148, and 150 feed forward as inputs to hidden layer 152, which includes nodes 154, 156, and 158, and so on. Finally, the outputs of nodes 162, 164, and 166 of the final hidden layer 160 feed forward as inputs to output layer 180, which includes nodes 182 and 184. Interconnections, or links, between neurons, shown in FIG. 1 as arrows between various nodes, may have respective weights associated with them. For example, the interconnection between node 108 of input layer 100 and node 128 of hidden layer 126 may be associated with a weight 114. In addition, the interconnection between node 108 of input layer 100 and node 130 of hidden layer 126 may be associated with a weight 118, the interconnection between node 110 of input layer 100 and node 128 of hidden layer 126 may be associated with a weight 116, the interconnection between node 110 of input layer 100 and node 130 of hidden layer 126 may be associated with a weight 120, the interconnection between node 112 of input layer 100 and node 128 of hidden layer 126 may be associated with a weight 122, and the interconnection between node 112 of input layer 100 and node 130 of hidden layer 126 may be associated with a weight 124. Similarly, the interconnections between the nodes of hidden layers 126 and 144 may be associated with weights 132, 134, 138, 136, 140, and 142, respectively, and the interconnections between the nodes of hidden layers 160 and output layer 180 may be associated with weights 168, 170, 172, 174, 176, and 178, respectively. Weights associated with the remaining interconnections between nodes in the illustrated neural network are not shown in FIG. 1 for simplicity.

Typically, except for the input layer, a node (neuron) may receive as input the outputs of nodes in its immediately preceding layer. Each node may calculate its output by, e.g., multiplying each of its inputs by each input's corresponding interconnection weight, summing the products of it inputs, adding (or multiplying by) a constant defined by another weight or bias that may be associated with that particular node, and applying a function, such as a non-linear or logarithmic function, to the result. The non-linear function may be referred to as an activation function or transfer function. Multiple activation functions are known in the art, and selection of a specific activation function is not critical to the present discussion. It is noted, however, that operation of the ML model, or behavior of the neural net, is dependent upon weight values, which may be learned so that the neural network provides a desired output for a given input.

Figure 2:
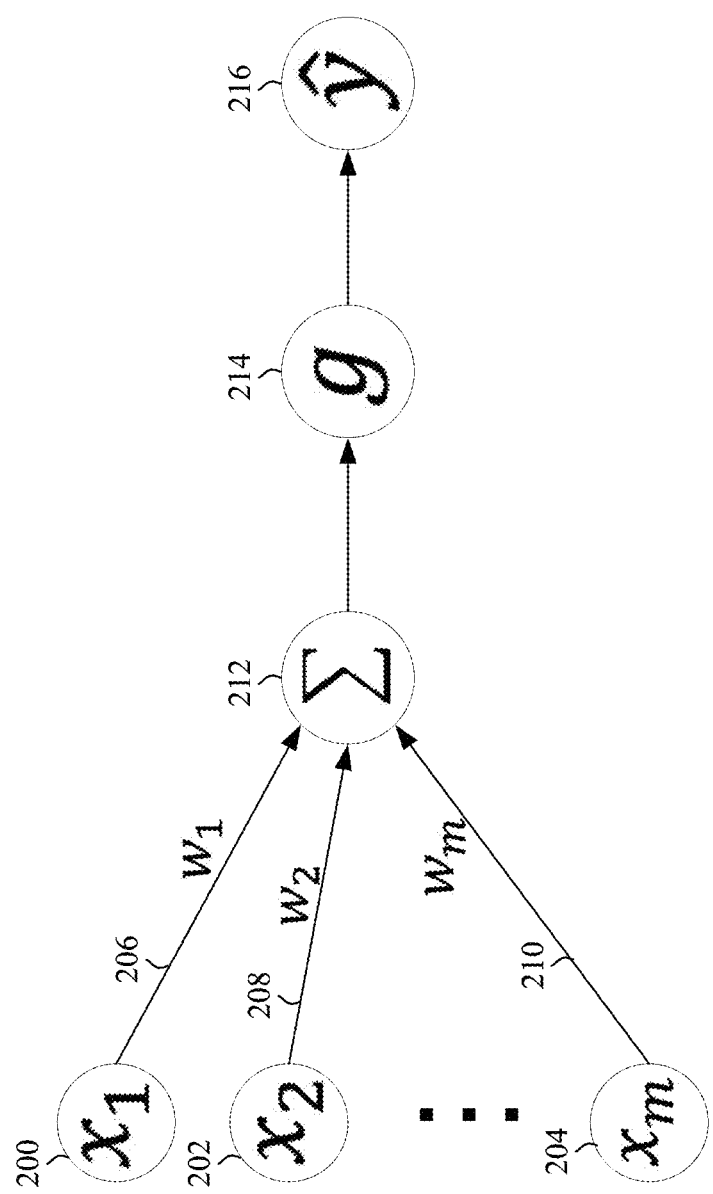
FIG. 2 illustrates selected elements of a simplified building block of a Deep Neural Network (DNN).

FIG. 2 illustrates, in a simplified view, selected elements of a building block of a Deep Neural Network (DNN). The illustrated building block generates an output vector $\hat{y}$ for a particular neural network node given inputs $x_1$ (200), $x_2$ (202), and $x_m$ (204), respective interconnection weights $w_1$ (206), $w_2$ (208), and $w_m$ (210), and a non-linear activation function g (214). In the illustrated example, the output vector $\hat{y}$ may be determined by applying the activation function g (214) to a linear combination of the inputs multiplied by their corresponding weights, as follows:

$$\hat{y} = g\left(\sum_{i=1}^{m} x_i w_i\right)$$

During a training, or learning, stage, the neural network may learn, e.g., may be trained to determine, appropriate weight values to achieve a desired output for a given input. Before the neural network is trained, the weights may be individually assigned an initial value, such as a random, and optionally non-zero, value. Various methods of assigning initial weights are known in the art. The weights are then trained, or optimized, so that for a given training vector input, the neural network produces an output close to a desired, e.g., a predetermined, training vector output. The desired output against which the current output is compared may be referred to as a label for the input data. A training vector input and its corresponding training vector output may be termed an input-output training pair, and a training data set may include multiple input-output training pairs, e.g., tens to millions, or more. In this manner, the weights may be incrementally adjusted in thousands of iterative cycles, such as by a technique termed back-propagation. Several back-propagation techniques are known in the art, including several based on gradient descent, such as batch gradient descent, stochastic gradient descent (SGD), which may include mini-batch gradient descent, distributed synchronous and asynchronous SGD, elastic averaging stochastic gradient descent (EASGD), Hogwild, etc. The different back-propagation techniques may differ in how specific aspects of gradient descent are implemented, but in general, irrespective of the back-propagation technique used, in each cycle of back-propagation, a training input (e.g., vector input) is fed forward through the neural network to determine its actual output (e.g., vector output). An error for each output neuron, or output node, is then calculated based on the actual neuron output and a target or desired training output for that neuron. The process then propagates back through the neural network (in a direction from the output layer back to the input layer), updating the weights based on how much effect each weight has on the overall error so that the output of the neural network moves closer to the desired training output. This cycle may then be repeated until the actual output of the neural network is within an acceptable error range of the desired training output. In machine learning, an epoch typically refers to one complete pass, including back-propagation, if applicable, of the full training dataset to be learned through the machine-learning model. In one epoch, the full training dataset may be submitted to the learning algorithm in a single training iteration, in which case a "batch" of training data is used, or the full training dataset may be submitted in the aggregate after multiple training iterations, each using a subset of the training dataset referred to as a "mini-batch".

Construction of a neural network model, or a machine-learning model in general, may include a learning stage, which may also be referred to as a training stage, and an inference stage, which may also be referred to as an operational, execution, or service stage. In the learning stage, the neural network may be trained for a specific purpose and may be provided with a set of training examples, including training inputs and training outputs provided as input-output training pairs, and optionally including a set of validation examples to test the progress of the training. During this learning process, various weights associated with nodes and node-interconnections (e.g., links) in the neural network may be incrementally adjusted in order to reduce the error between an actual output of the neural network and the desired training output. In this manner, a multi-layer feed-forward neural network, such as that discussed above, may be made capable of approximating any measurable function to any desired degree of accuracy. The result of the learning stage is a machine learning model that has been trained. In the inference stage, an input with unknown outputs may be submitted to the trained machine learning model, e.g., to server or edge device executing the trained ML model, which may apply what has been learned to process the input to produce an output prediction.

For ease of illustration, some aspects of a neural network framework may be disclosed herein within the context of practical example implementations. Due to real-world hardware limitations, neural networks may have practical size limits. For example, some ML models may achieve large sizes of 10 GB, or more, which may require a long time to train and complicate their hardware implementation. Therefore, in particular embodiments, an ML model may be distributed among multiple similar machines, e.g., machines having identical or substantially similar architectures, using various distributive techniques. Furthermore, it is typically desirable that the hardware, e.g., a computing system, used to train an ML model be tailored to the ML model itself and that all training be done on the same computing system. At times, a computing system used to train an ML model may include fast computing devices optimized for computational capacity and remote memory banks, e.g., parameter servers, that may hold interim parameter values, e.g., weight values.

As used herein, the terms "feature" or "features" may refer to input data or output data associated with a convolution operation. In particular embodiments, the output of each layer of a convolutional neural network may be represented by features that no longer resemble the original input in content, size, and/or shape. For example, an input image including 10×10 pixels with RGB channels may be represented by 10×10×3 features. After one round of convolution, the output may be represented by 4×4×2 features that might or might not look like an image. After a second round of convolution in which the 4×4×2 features are processed, the output may be represented by a 1×1 feature that looks nothing like an image, in this example. Features organized in a 3D manner may be referred to herein as a "tensor" having dimensions of height (x), width (y), and a number of channels (z). Note that image data is a very specific type of input that is commonly processed using machine learning and neural networks, but it is by no means the only type of data that can be processed using these techniques and using the ML accelerators described herein. For example, the input data processed by a convolutional neural network may represent a depth map, parameterized user information, a heat map for weather forecasting, etc.

Computing systems and system configurations may be tailored not only for particular types of machine learning models and training algorithms, but also for the types of data the machine learning model is designed to process. For example, machine learning models may receive different types of inputs or features, such as dense inputs, which are typically long vectors, sparse inputs, or a combination of both. Dense feature vectors may be used to represent dense inputs and sparse feature vectors may be used to represent sparse inputs. A dense feature vector may be represented by a mostly-populated vector, e.g., a vector having mostly non-zero entries/cells. A common example of a dense feature vector is image data. As another example, a dense feature vector may include determinable descriptors common to or determinable for most users or circumstances, depending upon the specific application, which may be gleaned from multiple sources. For example, dense features may include personal information associated with a user, information identifying a source of the input information, or other contextual information, such as a location, a time-of-day, etc. It is noted that some dense features may be obtained by user-provided input, while others may be collected from user-related demographic or geographic information, user-device status information, user network activity, or other observable user-related sources. A dense input may be thought of as a collection of multiple, definitely determinable descriptors, where each descriptor may be given a numeric value. Because dense inputs may comprise many descriptor types, e.g., many signal/value sources, that together may characterize, describe, or represent a user or circumstance, a dense input may be a large, dense vector with one or more cells/dimensions/entries in the dense vector being designated to each descriptor type.

A sparse input may reflect more semantic information related to a particular task objective. The sparse input may be defined by a sparse feature vector that identifies selections within a larger list(s) of options, such as lists that may further be divided/grouped into different categories. This may be the case when the list of identifiers that comprises the sparse input identifies individual selections from a larger list of options, such as those provided by the dense vector. As a result, a sparse vector may be characterized by having mostly zero entries, and a few non-zero entries. Consequently, a sparse vector may be represented as a series of indexes pointing to select cell positions in the larger list having non-zero values, along with each index's corresponding non-zero value for that position, with the understanding that all other positions not identified by index have a default zero value. Sparse inputs may not necessarily be directly descriptive of a user or circumstance but may instead provide auxiliary information indirectly related to the user or circumstance. Typically, because of their many zero-entry cells, sparse vectors may not be well-suited for direct input to a neural network.

Figure 3:
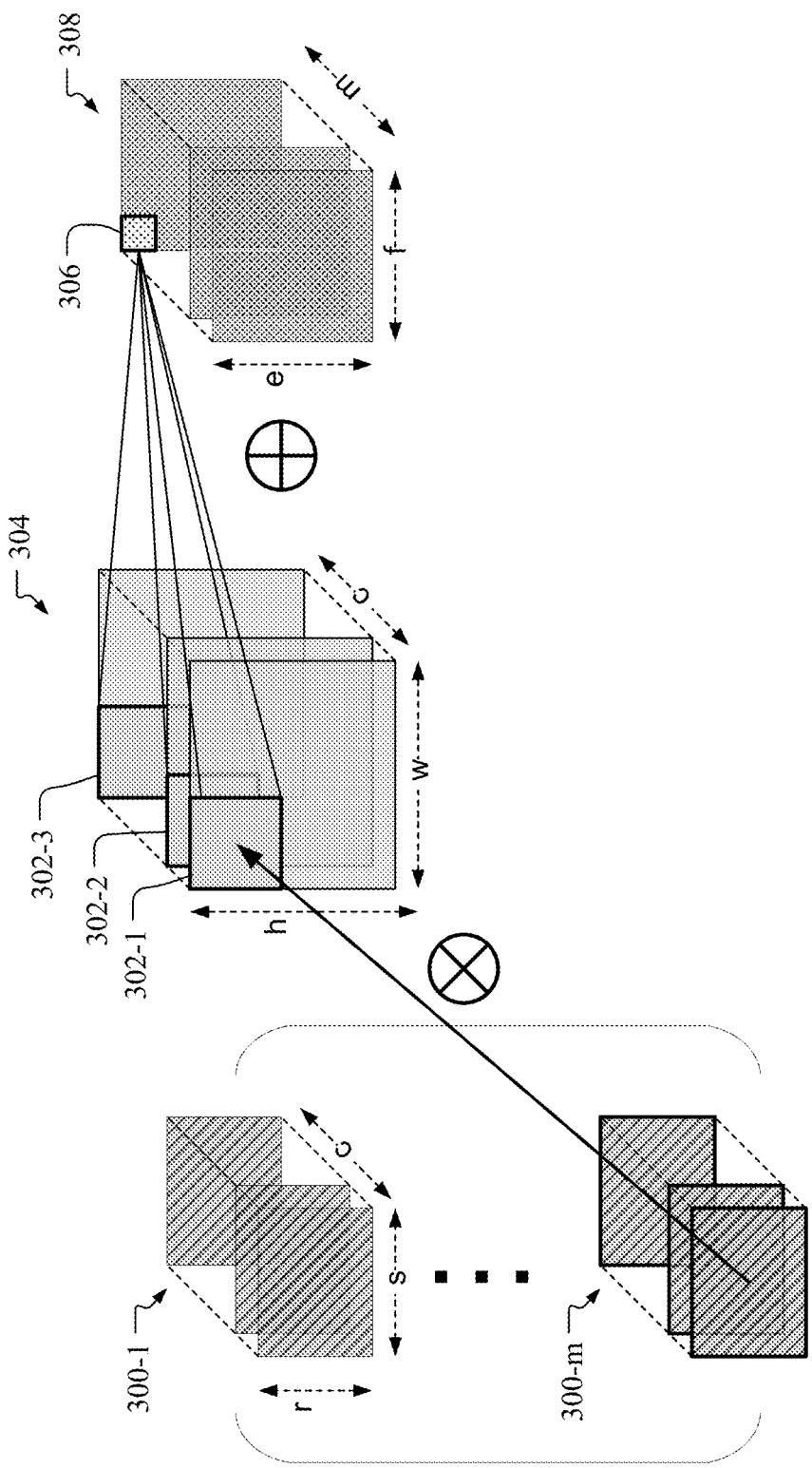
FIG. 3 illustrates selected elements of an example convolutional layer in a convolutional neural network (CNN).

FIG. 3 illustrates selected elements of an example convolutional layer in a convolutional neural network. In the illustrated example, a three-dimensional (3D) output feature map 308 is generated by performing a series of two-dimensional (2D) convolution operations over a 3D input feature map 304 using a collection of 2D convolution filters 300. More specifically, the input feature map 304 has dimensions h (height)×w (width)×c (where c represents the number of input channels) and the output feature map 308 has dimensions e×f×m (where m represents the number of output channels). In this example, multiple filters 300 are to be applied to the input feature map to generate each element, of each channel, of the output feature map. More specifically, a respective different filter 300 is applied to produce the elements of the output feature map for each given output channel. Therefore, the number of filters 300 (i.e., m) matches the number of output channels (m).

As shown in FIG. 3, each 3D filter 300 includes a respective 2D kernel of dimensions r×s for each input channel c, and each 2D filter kernel defines a collection of weights, where a respective weight value is associated with each kernel element, as identified by its position within the r×s kernel. For example, each 2D filter kernel may be represented as a 3×3 grid of weights to be convolved with a similarly-sized collection of features within input feature map 304. More specifically, each 2D kernel of filter 300-$m$ is applied in a convolution operation over the elements in a respective channel of input feature map 304. For example, a first 2D kernel of filter 300-$m$ provides the weights that are multiplied by respective values of the elements in an r×s sized portion 302-1 of the elements of a first channel of input feature map 304, a second 2D kernel of filter 300-$m$ provides the weights that are multiplied by respective values of the elements in an r×s sized portion 302-2 of the elements of a second channel of input feature map 304, and so on, such that a final 2D kernel of filter 300-$m$ provides the weights that are multiplied by respective values of the elements in an r×s sized portion 302-3 of the elements of the last channel of input feature map 304. The results of these multiplication operations are then combined to generate a single element 306 of a single channel of output feature map 308, as shown in FIG. 3. This process is repeated as the 2D kernels of filter 300-$m$ are applied to other portions of input feature map 304 to produce the remaining elements of output feature map 308 in the same output channel as element 306, and as the 2D kernels of respective other ones of the filters 300 are applied to input feature map 304 to produce the elements of output feature map 308 in each of the remaining output channels.

Figure 4:
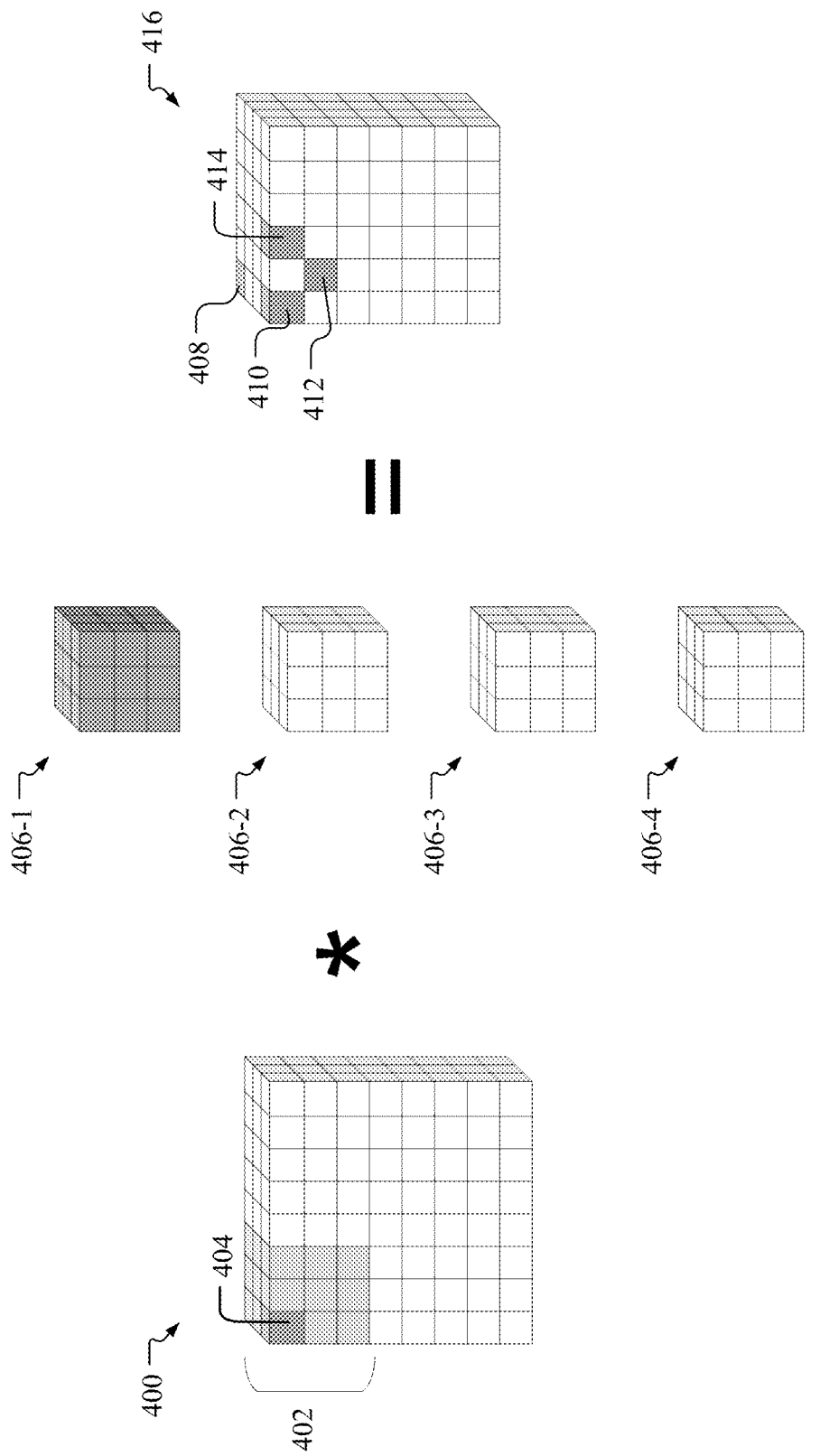
FIG. 4 illustrates an example multi-level convolution operation.

FIG. 4 illustrates an example multi-channel convolution operation, in accordance with particular embodiments. In this example, a multi-channel (3D) output feature map 416 is generated by the application of multiple 3D filters 406 to successive portions of a multi-channel (3D) input feature map 400. In this example, the dimensions of input feature map 416 are X×Y×Zin, where Zin represents the number of input channels, and the dimensions of output feature map 416 are Xout×Yout×Zout, where Zout represents the number of output channels. Each 3D filter 406 includes a respective 2D kernel of dimensions KernelX×KernelY for each output channel zout in Zout, where kx and ky represent the x/y position of a particular element of the 2D kernel corresponding to a particular output channel. In this example, the value of each element of output feature map 416 is computed as follows:

$$[x][y][zout] \mathrel{+}= activations[x+kx][y+ky][zin]*weights[kx][ky][zin][zout]$$

In the illustrated example, there is one 3D filter 406 for each channel (zout) in Zout. More specifically, the illustrated multi-channel convolution uses four 3D filters 406 to generate elements for each x/y position in each of four output channels, respectively, while sweeping the appropriate 2D kernels across and down the elements of input feature map 400 in each of the input channels. For example, the value of element 410 of output feature map 416 is determined by applying highlighted 3D filter 406-1 to the highlighted portion 402 of input feature map 400, i.e., 27 activations including 9 activations in respective x/y positions in each of 3 input channels zin. Similarly, the value of element 408 of output feature map 416 is determined by applying 3D filter 406-4 to the highlighted portion 402 of input feature map 400.

Traversing input feature map 400 in the x dimension involves sweeping the highlighted portion 402 across the input feature map such that element 404 moves one position to the right to identify a next set of activations for each successive iteration in the x dimension. For example, the value of element 414 of output feature map 416 is determined by applying 3D filter 406-1 to the highlighted portion 402 of input feature map 400 after the highlighted portion has been moved from the initial position in which it is shown in FIG. 4 to a location two positions to the right. Traversing input feature map 400 in the y dimension involves sweeping the highlighted portion 402 across the input feature map such that element 404 moves one position down to identify a next set of activations for each successive iteration in the y dimension. For example, the value of element 412 of output feature map 416 is determined by applying 3D filter 406-1 to the highlighted portion 402 of input feature map 400 after the highlighted portion has been moved from the initial position in which it is shown in FIG. 4 to a location one position down and one position to the right.

Performing the multi-channel convolution illustrated in FIG. 4 involves performing a series of 2D convolutions, as follows:

```
for zout in Zout
  for x in Xout
    for y in Yout
      for kx in KernelX
        for ky in KernelY
          for zin in Zin
            output[x][y][zout]+=
            activations [x+kx][y+ky][zin]*weights [kx][ky][zin][zout]
```

In particular embodiments, the generation of scalar addresses identifying the input and output elements for each 2D convolution is performed by the compiler when generating the tensor instructions that represent the multi-channel convolution. In particular embodiments, the generation of scalar addresses for each of the corresponding input tensors (activation addresses), weight tensors (weight addresses), and output tensor (output address) may be performed in hardware, such as within the ML accelerators described herein, in accordance with the following:

```
for the activation addresses:
  for x in Xout
    f or y in Yout
      for kx in KernelX
        for ky in KernelY
          for zin in Zin
            activations [x+kx] [y+ky] [zin],
for the weight addresses:
for zout in Zout
  for kx in KernelX
    for ky in Kernel Y
      for zin in Zin
``` weights[kx][ky][zin][zout],
and for the output address:
for zout in Zout
  for x in Xout
    for y in Yout
      for zin in Zin
        outputs[x][y][zout].

Figure 5A:
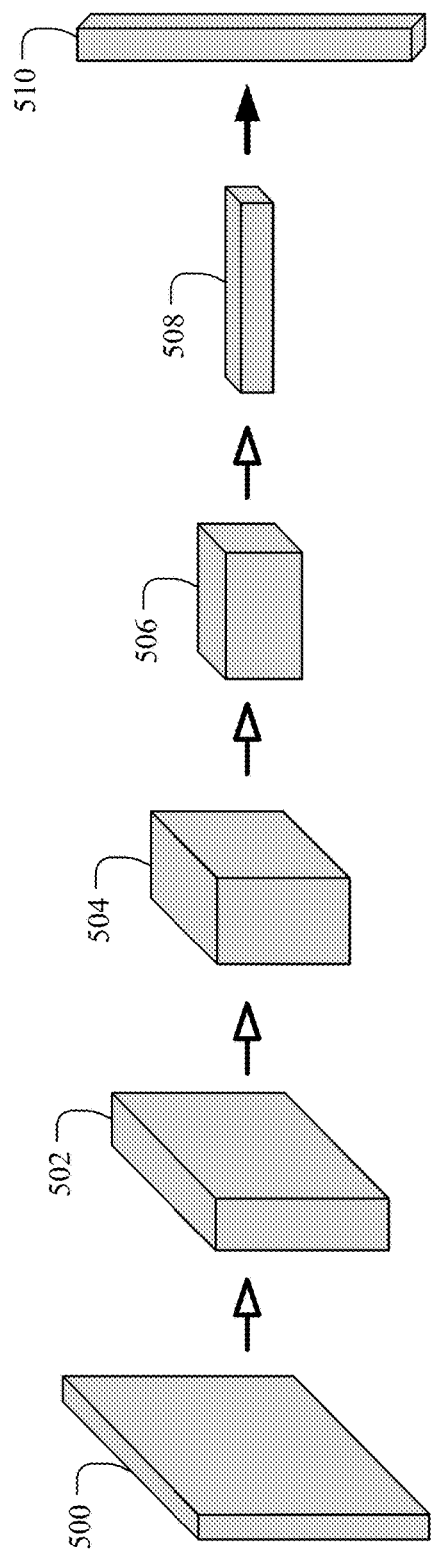
FIG. 5A illustrates an example CNN for a classification-type network.

FIG. 5A illustrates an example convolutional neural network in which an output feature map 510 is generated based on an input feature map 500 in a classification-type neural network. This type of neural network may typically involve a small or medium resolution input, a single vector output, and a relatively large number of output channels. In the illustrated example, intermediate feature maps of different sizes and shapes, shown as feature maps 502, 504, 506 and 508, are generated by performing successive convolution operations on each such intermediate feature map, in turn, and the output feature map 510 is generated by a fully connected (FC) layer operating on the final intermediate feature map 508. As shown in FIG. 5A, it may be typical for the overall size, and corresponding memory requirements, to be reduced for each successive intermediate feature map in a classification-type neural network.

Figure 5B:
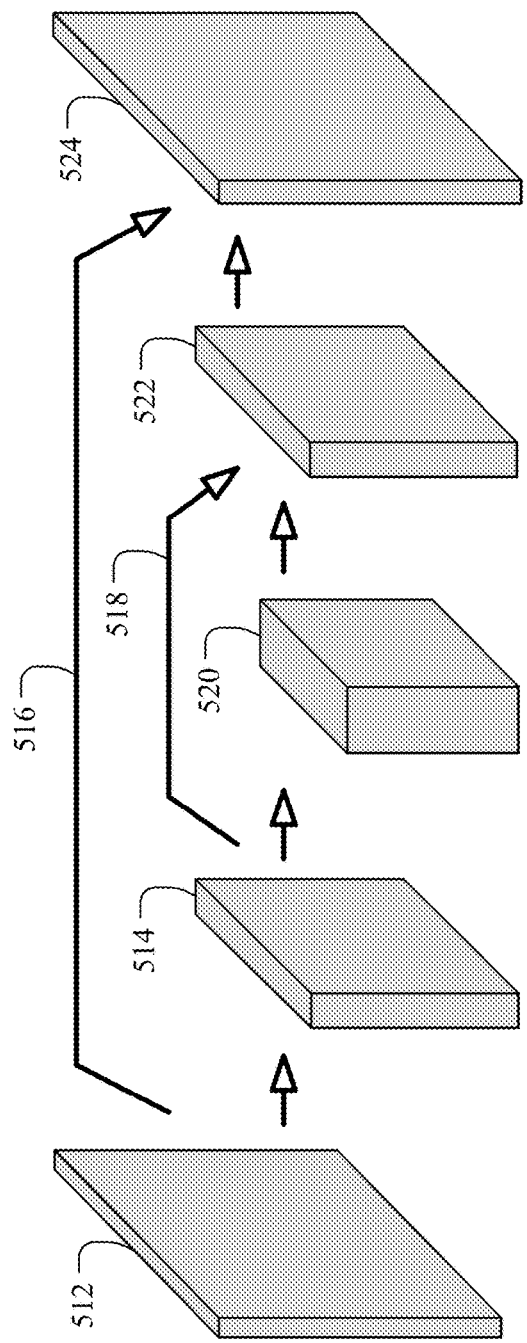
FIG. 5B illustrates an example CNN for a UNet-type network.

FIG. 5B illustrates an example CNN in which an output feature map 524 is generated based on an input feature map 512 in a UNet-type neural network. This type of neural network may involve high resolution input and/or output feature maps and a relatively small number of input and/or output channels. This type of neural network may also involve long skip connections such that a particular intermediate feature map may be dependent not only on the immediately preceding intermediate feature map but also on another previous intermediate feature map. Such skip connections are shown by arrows 516 and 518 in FIG. 5B. In the illustrated example, intermediate feature maps of different sizes and shapes, shown as feature maps 514, 520, and 522, are generated using a series of convolution operations prior to the generation of the output feature map 524. In this example, intermediate feature map 514 is generated based on input feature map 512, intermediate feature map 520 is generated based on intermediate feature map 514, intermediate feature map 522 is generated based on both intermediate feature map 520 and on intermediate feature map 514, and output feature map 524 is generated based on both intermediate feature map 522 and input feature map 512. In particular embodiments, such as in AR/VR applications, the input and output feature maps may have similar sizes and shapes, while the sizes and shapes of the intermediate feature maps may vary widely. For example, in some cases, a particular intermediate feature map may be shorter, narrower, and/or shallower than the preceding feature map(s) from which it was generated, while in other cases, a particular feature map may be taller, wider, and/or deeper than the preceding feature map(s) from which it was generated.

As noted above, in a convolutional neural network, the convolutional layers typically account for the vast majority of the computations performed and the data movement within the CNN and/or between the CNN and other elements of an ML model, making them a performance bottleneck. Therefore, modern CNN accelerators focus on using high compute parallelism along with an optimized data orchestration throughout the memory hierarchy to speed up the processing of convolutional layers. Conventionally, individual tensor processor units within a machine learning accelerator may asynchronously perform convolution operations (e.g., multiplication, accumulation, pooling, and the like) on image data or another type of input feature map, or a portion thereof that has been spatially partitioned. However, effectively harnessing the compute power of these accelerators may require the design of a particular mapping scheme that dictates when (i.e., at which processing cycle) and where (i.e., at which compute data path among hundreds to thousands of them) each operation (i.e., each multiply-and-accumulate, or MAC) is performed. The design of such a mapping scheme may, in turn, have an impact on the hardware architecture design, as the hardware would need to be able to deliver data at the right time and in the right format to the right compute data path so that it can be operated on in the right cycle.

The ML accelerators described herein employ a multi-level control architecture designed to optimally exploit parallelism provided by tensor processor units in the ML accelerator. These machine learning accelerators may include one or more tensor processor clusters, each of which may include multiple tensor processor units. Each tensor processor unit may be a single-instruction-multiple-data (SIMD) machine that includes a compute array capable of performing vector operations to implement data parallelism or model parallelism at the tensor processor unit or tensor processor cluster level. Each tensor processor cluster may include a shared controller that controls and synchronizes the operations of the tensor processor units within the cluster so that they perform a common series of operations in parallel and in lockstep. As described in more detail herein, the multi-level control architecture may support more flexibility in parallelism for computations of neural network layers than is possible using existing ML acceleration schemes, while lowering hardware costs due to the physical circuit area and/or power consumed by various tensor instructions. The multi-level apparatus may be used to implement any of a variety of neural network solutions to machine learning problems including, but not limited to, object identification, feature classification, or content-driven image processing. The multi-level apparatus may be particularly well suited for implementation within edge devices that have strict power consumption constraints and that run inference exercises using previously trained models in real time, such as in AR/VR headsets.

Figure 6:
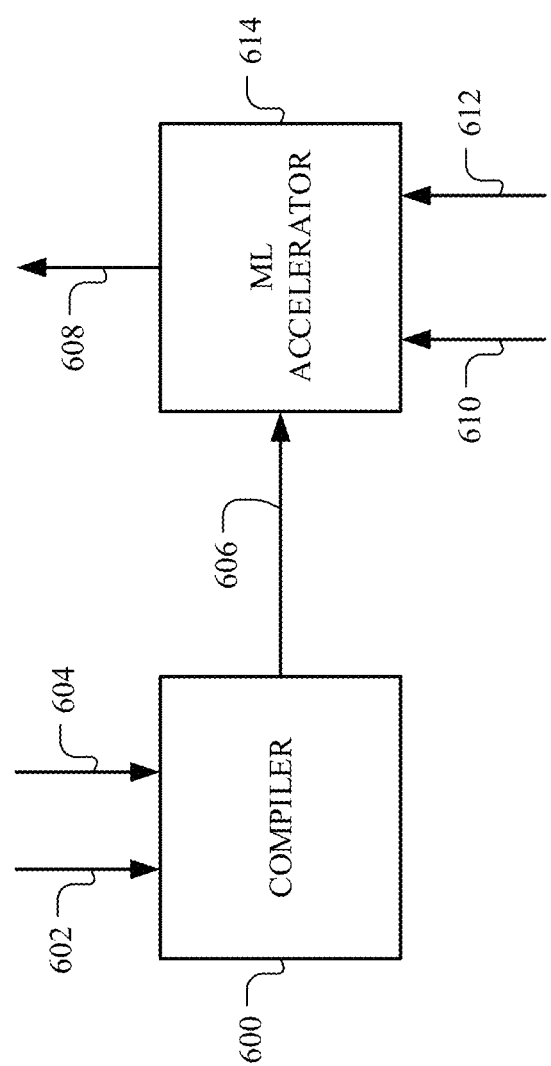
FIG. 6 illustrates selected elements of an example system including a compiler and an ML accelerator.

FIG. 6 illustrates selected elements of an example system including a compiler 600 and an ML accelerator 614. In the illustrated example, compiler 600 generates machine language instructions, shown as tensor instructions 606, based on inputs including programming language instructions 602 and configuration information 604 indicating the configuration of a neural network that is to perform the tensor instructions 606. In this example system, ML accelerator 614 receives the tensor instructions 606 and generates, for input features 610 and applicable weights 612, output features 608. For example, compiler 600 may, in accordance with an instruction set architecture (ISA) that is used to facilitate machine learning processing for a specific hardware architecture, map a single ML operation (such as a convolution operation) to multiple machine language instructions, any or all of which may be multi-dimensional (tensor) instructions. In particular embodiments, a full ML layer may be represented using one or more instructions in each of three classes of hardware instructions: compute instructions, non-linear unit (NLU) instructions, and direct-memory access (DMA) instructions.

In particular embodiments, the compiler 600 may analyze a workload to be performed by the neural network and determine respective coarse-grained tensor instructions to be sent to each tensor processor cluster of ML accelerator 614 using a SIMD and/or single-program-multiple-data (SPMD)

approach to distribute the workload. The compiler 600 may distribute the workload based on the architecture of the neural network, the number of tensor processor clusters, the number and processing capacity of the tensor processor units in each tensor processor cluster, the input and output feature dimensions, the number and types of convolutions and other operations to be performed at different layers of the neural network, and/or the relationships between the output features produced at each layer and the input features required at the next layer. The workload distribution decisions may maximize the reuse of locally available feature sets and weights once they are loaded into the memories of particular tensor processor units, reduce the amount of data movement required between and within tensor processor clusters, and optimize resource utilization in ML accelerator 614.

Figure 7A:
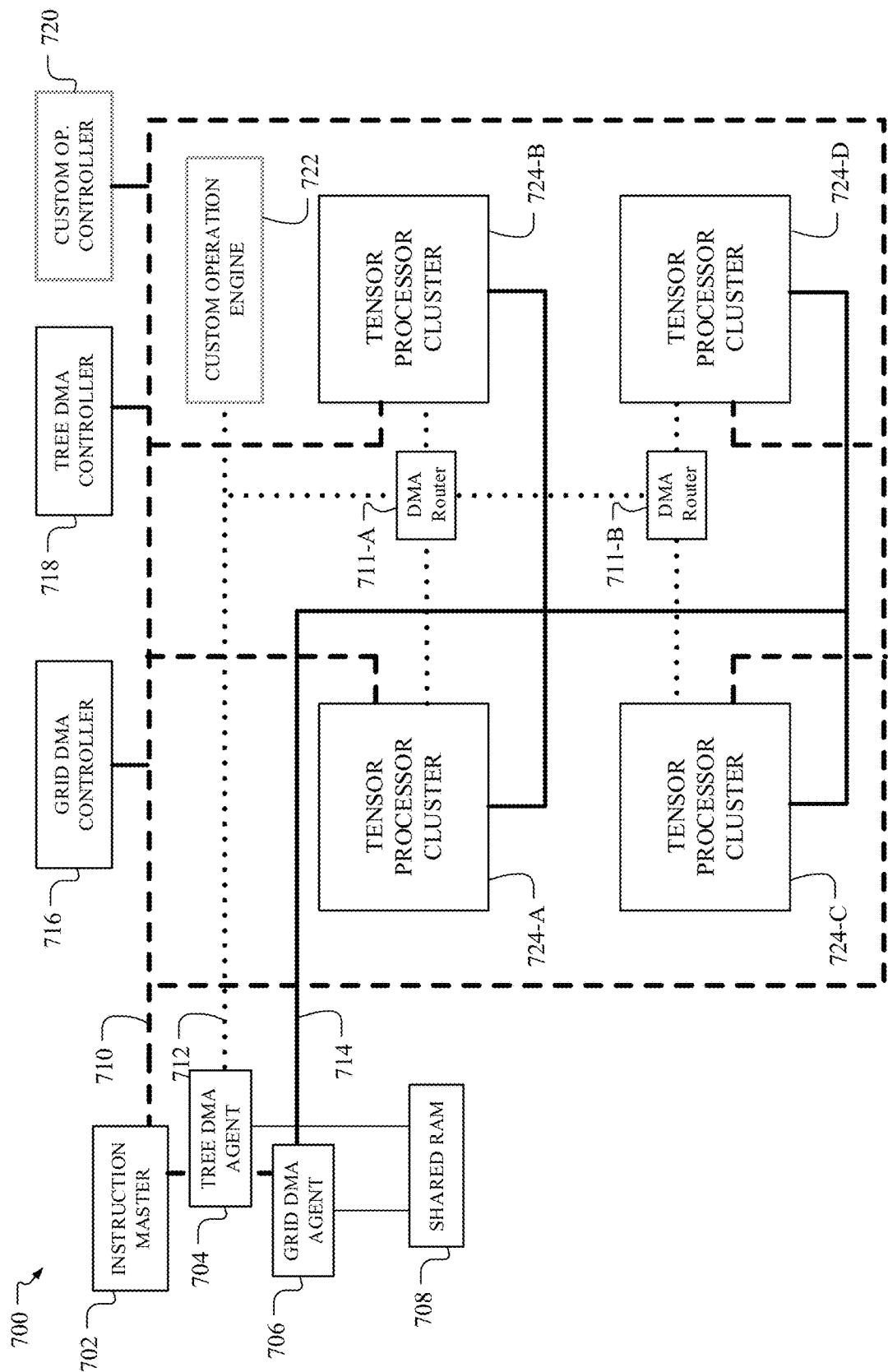
FIG. 7A illustrates selected elements of an example ML accelerator including multiple tensor processor clusters.
Figure 7B:
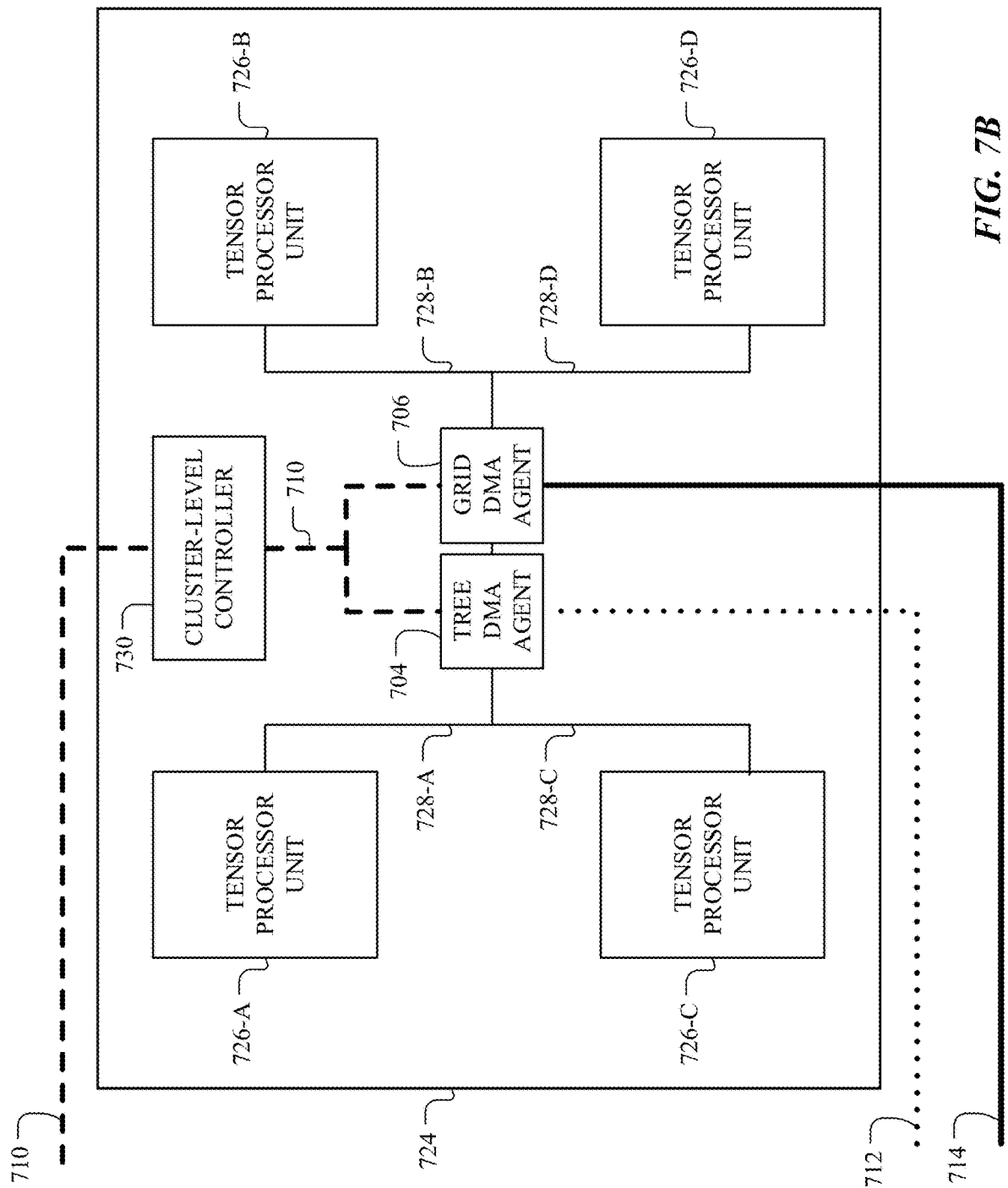
FIG. 7B illustrates selected elements of an example tensor processor cluster.
Figure 7C:
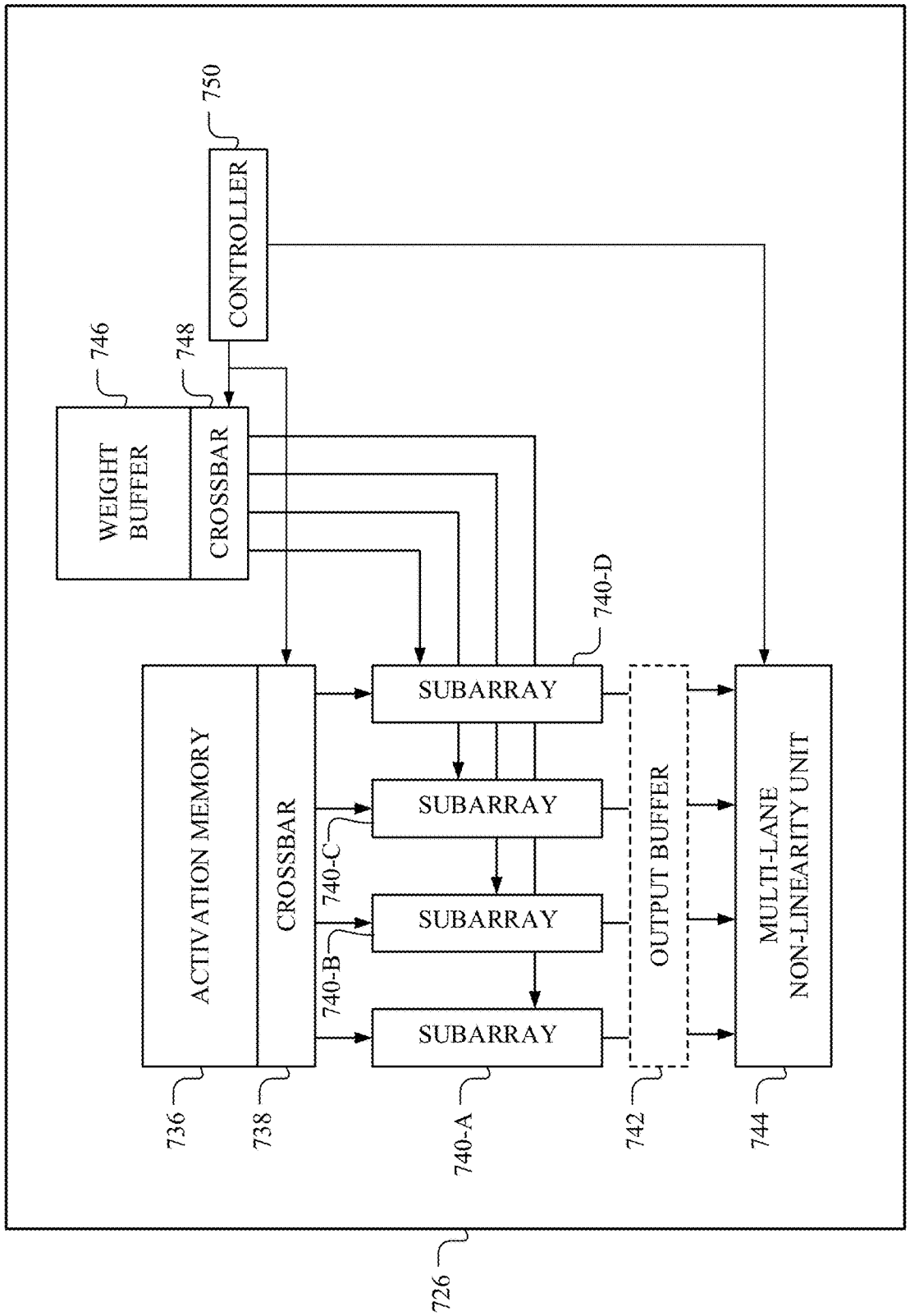
FIG. 7C illustrates selected elements of an example tensor processor unit.

FIGS. 7A through 7C illustrate selected elements of an example ML accelerator, such as an ML accelerator similar to ML accelerator 614 illustrated in FIG. 6, at different levels of the multi-level accelerator architecture. For example, FIG. 7A illustrates that an example ML accelerator 700 may include four tensor processor clusters 724 and may include, or be communicably coupled to, grid DMA controller 716, a tree DMA controller 718, and/or an optional custom operation engine 722 and a corresponding optional custom operation controller 720. ML accelerator 700 may include, or be communicably coupled to, an instruction master 702, which may be communicably coupled to each of the four tensor processor clusters 724, the grid DMA controller 716, the tree DMA controller 718, tree DMA agent 704, and grid DMA agent 706 over an instruction bus 710. Tree DMA agent 704 and grid DMA agent 706 may additionally be communicably coupled to a shared RAM 708. Tree DMA agent 704 may be communicably coupled to each of the four tensor processor clusters 724 (via DMA routers 711) and the optional custom operation engine 722 over tree DMA bus 712. Grid DMA agent 706 may be communicably coupled to each of the four tensor processor clusters 724 over grid DMA bus 714. In at least some embodiments, ML accelerator 700 may also include a synchronization bus (not shown in FIG. 7A) communicably coupled to the four tensor processor clusters 724, the grid DMA controller 716, the tree DMA controller 718, the optional custom operation engine 722 and corresponding optional custom operation controller 720, the instruction master 702, the tree DMA agent 704, the grid DMA agent 706, and/or the shared RAM 708, or any suitable subset thereof.

In one embodiment, grid DMA controller 716 may comprise a system, device, or apparatus generally operable to generate source addresses and destination addresses used to distribute input features 610 (illustrated in FIG. 6), or "tensor data," throughout ML accelerator 700. Specifically, grid DMA controller 716 may iteratively generate source addresses indicating locations in a source memory and destination addresses indicating locations in a destination memory to form address pairs, or "source address and destination address pairs," used to distribute tensor data over grid DMA bus 714. In the example illustrated in FIG. 7A, grid DMA controller 716 may be communicably coupled to grid DMA agent 706 over instruction bus 710. Additionally, grid DMA controller 716 may be communicably coupled to each tensor processor cluster 724 in ML accelerator 700 over instruction bus 710. Grid DMA controller 716 may generate source address and destination address pairs based on tensor instructions 606 (illustrated in FIG. 6) received from compiler 600 over instruction bus 710. In one embodiment, grid DMA controller 716 may send generated source address and destination address pairs to grid DMA agent 706 such that grid DMA agent 706 may use the source address and destination address pairs to transfer tensor data to one or more tensor processor clusters 724 for processing. Specifically, grid DMA agent 706 may transfer tensor data from shared RAM 708 in one or more burst transmissions to tensor processor clusters 724 (via grid DMA bus 714) such that tensor processor clusters 724 may process the tensor data individually or in parallel with one another. In another embodiment, grid DMA controller 716 may send generated source address and destination address pairs to tensor processor clusters 724 over instruction bus 710. Here, tensor processor clusters 724 may transfer tensor data in one or more burst transmissions to one another for additional processing or transfer processed tensor data in one or more burst transmissions back to shared RAM 708. In other embodiments, grid DMA controller 716 may send a generated source address to grid DMA agent 706 and a generated destination address to tensor processor clusters 724, send a generated source address to tensor processor clusters 724 and a generated destination address to grid DMA agent 706, and/or any combination of source address and destination address pair distribution schemes suitable for distributing tensor data throughout ML accelerator 700. Grid DMA controller 716 is discussed in further detail with respect to FIG. 7D.

In one embodiment, grid DMA agent 706 may comprise a system, device, or apparatus generally operable to distribute tensor data in one or more burst transmissions according to source address and destination address pairs generated by grid DMA controller 716. For example, grid DMA agent 706 may distribute input features 610 (illustrated in FIG. 6) received by ML accelerator 700 (stored in shared RAM 708) to tensor processor clusters 724 such that each tensor processor cluster 724 may process the tensor data individually or in parallel with one another. In the example illustrated in FIG. 7A, grid DMA agent 706 is communicably coupled to grid DMA controller 716 over instruction bus 710. Grid DMA agent 706 may receive source address and destination address pairs generated by grid DMA controller 716 over instruction bus 710 and use the source address and destination address pairs to transmit tensor data from a source address to a destination address. For example, a source address may indicate a location in shared RAM 708 where a portion of a multi-dimensional source tensor is stored, and a destination address may indicate a location in an activation memory 736 of a tensor processor unit 726 (illustrated in FIG. 7C) where the portion of the source tensor is to be stored (i.e., as a destination tensor). In the embodiment illustrated in FIG. 7A, each tensor processor cluster 724 of ML accelerator 700 may include a respective grid DMA agent 706 (illustrated in FIG. 7B) for distributing tensor data in one or more burst transmissions based on source address and destination address pairs generated by grid DMA controller 716. Specifically, grid DMA agent 706 within each tensor processor cluster 724 may be communicably coupled to grid DMA controller 716 over instruction bus 710 to receive generated source address and destination address pairs. In addition, each grid DMA agent 706 within ML accelerator 700 may be communicably coupled to shared RAM 708, and to one another, via grid DMA bus 714 for receiving, and distributing, tensor data in one or more burst transmissions. Grid DMA agent 706 is discussed in further detail with respect to FIG. 7D.

In one embodiment, each tensor processor cluster 724 may comprise a system, device, or apparatus generally operable to process tensor data. In particular, each tensor processor cluster 724 may perform various neural network operations (e.g., convolution, bias-add, normalization, residual addition, and the like) on tensor data received from shared RAM 708 and/or from other tensor processor clusters 724 such that the tensor data may be processed (e.g., for presentation to a user). As described above, each tensor processor cluster 724 of ML accelerator 700 may include a respective grid DMA agent 706 (illustrated in FIG. 7B) for distributing tensor data in one or more burst transmissions based on source address and destination address pairs generated by grid DMA controller 716. To receive generated source address and destination address pairs, grid DMA 706 agent within each tensor processor cluster 724 may be communicably coupled to grid DMA controller 716 over instruction bus 710. As shown in FIG. 7A, each tensor processor cluster 724 in ML accelerator 700 may be communicably coupled to one another via grid DMA bus 714, thereby allowing tensor processor clusters 724 to process tensor data individually or in parallel with one another.

In one embodiment, one or more tensor processor clusters 724 may be selected by the compiler to process tensor data based on a partitioning scheme. For instance, tensor data may be spatially-partitioned or batch-partitioned to facilitate an optimized workflow for processing the tensor data. In some embodiments, this optimized workflow may require tensor processor clusters 724 of ML accelerator 700 to process tensor data in parallel. For example, each tensor processor cluster 724-A through D may process respective batch-partitioned tensor data, or portions of the same spatially-partitioned tensor data, in lockstep with one another to minimize latency and maximize throughput. The compiler may select a partitioning scheme (e.g., batch-partitioned, spatially-partitioned, and the like) that best exploits parallelism across multiple tensor processor clusters 724. For example, tensor data comprising a large digital image may be spatially-partitioned into four smaller portions (i.e., quartered) such that each tensor processor cluster 724-A through D is selected to process a quarter of the overall digital image. Here, because each tensor processor cluster 724 has been selected to receive a portion of the same digital image, tensor instructions from the compiler may instruct grid DMA controller 716 to generate destination addresses within each tensor processor cluster 724 such that tensor data may be transmitted in one or more burst transmissions to tensor processor clusters 724 for processing the digital image in parallel. In another example, tensor data comprising an RGB image (comprised of red, green, and blue neural network channels) may be batch-partitioned such that tensor processor clusters 724-A, B, and C receive the red, green, and blue neural network channels, respectively. In this example, tensor instructions from the compiler may instruct grid DMA controller 716 to generate destination addresses within tensor processor clusters 724-A, B, and C for processing three respective sets of tensor data comprising the RGB image (i.e., corresponding to red, green, and blue neural network channels) in parallel.

In one embodiment, a source address may indicate a location in shared RAM 708 and a destination address may indicate a location in a destination memory within a tensor processor cluster 724. For example, a multi-dimensional source tensor may be stored in shared RAM 708 and source addresses generated by grid DMA controller 716 may each indicate a location in shared RAM 708 where a portion of the source tensor is stored. Each tensor processor cluster 724 may include tensor processor units 726 (illustrated in FIG. 7B) that each include an activation memory 736 (illustrated in FIG. 7C) used to store tensor data. Here, destination addresses generated by grid DMA controller 716 may each indicate a location in an activation memory of a tensor processor unit within tensor processor cluster 724. In one embodiment, the source address and destination address pair may be sent to grid DMA agent 706 (e.g., over instruction bus 710) such that grid DMA agent 706 may read a portion of the source tensor from shared RAM 708 and issue a write request to the activation memory of the tensor processor cluster 724 specified by the destination address generated by grid DMA controller 716. In another embodiment, the source address and destination address pair may be sent to grid DMA agent 706 (illustrated in FIG. 7B) located within a tensor processor cluster 724 selected by the compiler to process tensor data. For example, compiler 600 (illustrated in FIG. 6) may select tensor processor cluster 724-B to process tensor data received by ML accelerator 700. Here, grid DMA controller 716 may send source address and destination address pairs to a grid DMA agent (not shown in FIG. 7A) located within tensor processor cluster 724-B over instruction bus 710. Upon receiving the source address and destination address pairs, the grid DMA agent within tensor processor cluster 724-B may read portions of the source tensor from shared RAM 708 based on the generated source addresses, and may store the portions of the source tensor in an activation memory of a tensor processor unit (not shown in FIG. 7A) within tensor processor cluster 724-B as a destination tensor based on the generated destination addresses.

In one embodiment, a source address may indicate a location in a source memory within a first tensor processor cluster 724 and a destination address may indicate a location in a destination memory within a second tensor processor cluster 724. As described above, each tensor processor cluster 724 may include tensor processor units that each include a respective activation memory used to store tensor data. Here, a multi-dimensional source tensor may be stored in a first activation memory of a first tensor processor cluster 724 and source addresses generated by grid DMA controller 716 may each indicate a location in the first activation memory where a portion of the source tensor is stored. Similarly, destination addresses generated by grid DMA controller 716 may each indicate a location in a second activation memory of a second tensor processor cluster 724 where a portion of a destination tensor is to be stored. Thus, tensor processor clusters 724 may share tensor data, or processed portions thereof, by transmitting the tensor data in one or more burst transmissions between respective activation memories (via grid DMA bus 714) using source address and destination address pairs generated by grid DMA controller 716. In one embodiment, tensor processor clusters 724 may share portions of processed tensor data comprising overlapping regions of spatially-partitioned tensor data. That is, respective portions of spatially-partitioned tensor data may each include overlapping regions of tensor data shared with adjacent portions (e.g., along one or more borders of each portion) to facilitate a convolution operation. For example, a large digital image may be spatially-partitioned into four smaller portions (i.e., quartered) to be processed by tensor processor clusters 724-A through D. The four smaller portions each include overlapping regions of tensor data shared with adjacent smaller portions that allow a kernel, or kernels, to advance beyond one or more borders of the smaller portion as tensor processor cluster 724 performs a convolution operation. Here, tensor processor cluster 724-A may send overlapping regions of processed tensor data to tensor processor clusters 724-B through D when performing convolution operations on adjacent portions of the same spatially-partitioned tensor data. Similarly, tensor processor cluster 724-B may send overlapping regions of processed tensor data to tensor processor clusters 724-A, C, and D. Tensor processor cluster 724-C may send overlapping regions of processed tensor data to tensor processor clusters 724-A, B, and D. Tensor processor cluster 724-D may send overlapping regions of processed tensor data to tensor processor clusters 724-A through C. In this way, tensor processor clusters 724 may expedite various neural network operations and reduce overall power consumption of ML accelerator 700 by sharing processed tensor data rather than requiring each tensor processor cluster 724 to process shared tensor data individually.

In one embodiment, a source address may indicate a location in a source memory within a tensor processor cluster 724 and a destination address may indicate a location in shared RAM 708. As described above, each tensor processor cluster 724 may perform various neural network operations (e.g., convolution, bias-add, normalization, residual addition, and the like) on tensor data received from shared RAM 708 and/or from other tensor processor clusters 724 such that the tensor data may be processed (e.g., for presentation to a user). Each tensor processor cluster 724 may include tensor processor units 726 (illustrated in FIG. 7B) that each include an activation memory 736 (illustrated in FIG. 7C) in which tensor data may be stored. For example, a multi-dimensional source tensor comprised of processed tensor data may be stored in an activation memory. Here, source addresses generated by grid DMA controller 716 may each indicate a location in the activation memory where a portion of the source tensor is stored. Destination addresses generated by grid DMA controller 716 may each indicate a location in shared RAM 708 where the processed tensor data is to be stored. In one embodiment, the source address and destination address pair may be sent to grid DMA agent 706 (e.g., over instruction bus 710) such that grid DMA agent 706 may read a portion of the source tensor from the activation memory within the tensor processor cluster 724 specified by the source address. Grid DMA agent 706 may then issue a write request to shared RAM 708 at the location specified by the destination address generated by grid DMA controller 716. In another embodiment, the source address and destination address pair may be sent to grid DMA agent 706 (illustrated in FIG. 7B) located within a tensor processor cluster 724 selected by the compiler to process tensor data. For example, compiler 600 (illustrated in FIG. 6) may select tensor processor cluster 724-A to process tensor data received by ML accelerator 700. Here, grid DMA controller 716 may send source address and destination address pairs to grid DMA agent 706 (not shown in FIG. 7A) located within tensor processor cluster 724-A over instruction bus 710. Upon receiving the source address and destination address pairs, the grid DMA agent within tensor processor cluster 724-A may read portions of the source tensor from activation memory within tensor processor cluster 724-A based on the generated source addresses, and may store the portions of the source tensor in shared RAM 708 as a destination tensor based on the generated destination addresses.

In one embodiment, grid DMA bus 714 may comprise a system, device, or apparatus generally operable to communicably couple each grid DMA agent within ML accelerator 700 to a source memory and a destination memory. In the example illustrated in FIG. 7A, each tensor processor cluster 724 is communicably coupled to grid DMA bus 714. In one embodiment, grid DMA bus 714 may be of a tree network topology, allowing grid DMA agent 706 to distribute tensor data to tensor processor clusters 724 (and vice versa) directly, thereby minimizing latency and overall power consumption of ML accelerator 700. In one embodiment, tensor data may be sent to tensor processor clusters 724 (i.e., the grid DMA agent therein) in a broadcast distribution, in which each tensor processor cluster 724 receives the same tensor data for processing. Because grid DMA bus 714 communicably couples each tensor processor cluster 724 to shared RAM 708 according to a tree network topology, tensor processor clusters 724 may receive tensor data in a broadcast, or multicast, distribution at approximately the same instance. This allows each tensor processor cluster 724 selected by the compiler to receive tensor data to begin processing the tensor data in lockstep with one another. Therefore, the tree-like architecture of grid DMA bus 714 illustrated in FIG. 7A promotes increased parallelism for processing tensor data over other network topologies (e.g., star topology, ring topology, mesh topology, and the like) while having the granularity to access activation memories 736 (illustrated in FIG. 7C) within individual tensor process units 726 (illustrated in FIG. 7B) of each tensor processor cluster 724.

FIG. 7B illustrates selected elements of an example tensor processor cluster, such as one of the four tensor processor clusters 724 of ML accelerator 700 illustrated in FIG. 7A. In this example, tensor processor cluster 724 includes four tensor processor units 726-A through D, a shared cluster-level controller 730, a tree DMA agent 704, a grid DMA agent 706, and four DMA bus sub-branches 728-A through D communicably coupling tensor processor units 726 to tree DMA bus 712 and grid DMA bus 714.

In one embodiment, cluster-level controller 730 may comprise a system, device, or apparatus generally operable to interpret coarse-grained tensor instructions received from a compiler, such as compiler 600 illustrated in FIG. 6, and translate it into a series of fine-grained tensor instructions that may be sent to tensor processor units 726 in tensor processor cluster 724 tasked with performing a common series of operations. Each of these fine-grained tensor instructions may include neural network operations (e.g., convolution, bias-add, normalization, pooling, and the like) to be performed by hardware compute arrays within each tensor processor unit 726 or may represent a non-linear instruction to be applied to an intermediate output of the hardware compute arrays to produce an element of an output feature. In addition, cluster-level controller 730 may include synchronizers that synchronize the operations of the tensor processor units 726 within tensor processor cluster 724 so that they may perform the common series of operations in parallel and in lockstep. In particular, cluster-level controller 730 may use the synchronizers to generate a token indicating that tensor processor units 726 have completed the common series of operations and that the tensor data was processed. In one embodiment, cluster-level controller 730 may send the token to grid DMA controller 716 such that grid DMA controller 716 may instruct grid DMA agent 706 to retrieve additional tensor data from shared RAM 708 to distribute to tensor processor units 726 for further processing in lockstep. Cluster-level controller 730 may ensure that the appropriate subsets of the tensor data and the set of weights to be applied for each operation have been loaded into the local memory of each tensor processor unit 726 tasked with performing the common series of operations. In one embodiment, this may include generating an address pattern for the weights and/or generating an address pattern for the outputs of the common series of operations.

In the example illustrated in FIG. 7B, cluster-level controller 730 receives tensor instructions (e.g., coarse-grained tensor instructions) over instruction bus 710. Each coarse-grained tensor instruction sent to a tensor processor cluster 724 may encode information usable by the tensor processor cluster 724 to perform a multi-cycle operation corresponding to a part of a single neural network layer. In one example, using a single-program-multiple-data (SPMD) approach, compiler 600 (illustrated in FIG. 6) may distribute a workload such that different tasks are assigned to different tensor processor clusters 724 with some or all of the tensor processor clusters 724 operating on the same tensor data. In another example, using a single-instruction-multiple-data (SIMD) approach, compiler 600 may distribute the workload such that the same tasks are assigned to multiple tensor processor clusters 724 and such that each of those multiple tensor processor clusters 724 operates on different tensor data, such as on a different subset of an input feature for the neural network. Using this approach, the tensor processor clusters 724 may operate in parallel and may typically, but not necessarily, operate in lockstep with one another.

Convolutional neural networks used in AR/VR applications must typically support input and output feature maps with a wide variety of shapes and sizes, especially along the channel dimension. With existing ASIC accelerators, supporting this diversity can result in decreased hardware utilization and a corresponding loss of performance and energy efficiency. The tensor processor units described in this application address this problem using flexible hardware resources and flexible computation-to-hardware mapping. For example, FIG. 7C illustrates selected elements of an example tensor processor unit 726, such as one of the four tensor processor units 726 of tensor processor cluster 724 illustrated in FIG. 7B. In particular embodiments, tensor processor unit 726 is implemented with a flexible architecture in which computation components are organized such that the tensor processor unit 726 can support a variety of convolutional layer shapes with high resource utilization and high reuse of locally available data. The tensor processor unit 726 may be a SIMD machine that includes a compute array capable of performing vector operations that collectively implement higher-level tensor instructions using data parallelism or model parallelism in a neural network. In the example illustrated in FIG. 7C, tensor processor unit 726 includes an activation memory 736, a first crossbar 738, four compute subarrays 740, an optional output buffer 742, a multi-lane non-linearity unit 744, a weight buffer 746, e.g., a register file storing weights, a second crossbar 748, and a local controller 750. In particular embodiments, tensor processor unit 726 may, during operation, be dynamically configured to perform convolution operations of different sizes and shapes by controlling the size and shape of the input feature map data and weights supplied to each of the subarrays 740 and MAC computation units thereof using the flexible crossbars 738 and 748 and by controlling the reduction and/or combination of the outputs of each of the subarrays 740 and MAC computation units thereof to generate an output feature map of a desired size and shape. In particular embodiments, tensor processor unit 726 may also be configured to perform group convolution operations in which not all output elements depend on the same input elements or weights.

In the illustrated example, activation memory 736 includes local memory elements that store tensor data (e.g., input feature map elements) to be provided to various ones of the subarrays 740. The first crossbar 738 is a first flexible many-to-many crossbar that reads tensor data (e.g., pixel values) from activation memory 736 and provides them to the appropriate subarrays 740 in each cycle. In the illustrated example, weight buffer 746, which may be implemented as a register file, includes local memory elements that store the filter weights to be provided to various ones of the subarrays 740. The second crossbar 748 is another flexible crossbar that loads filter weights from weight buffer 746 and provides them to the appropriate subarrays 740 in each cycle.

In particular embodiments, each of the four compute subarrays 740 includes an array of multiply-and-accumulate (MAC) computation units of a given size that operate in parallel to apply the weights defined for a given 2D kernel of a given 3D convolution filter to portions of an input feature map and produce portions of an output feature map. The output feature map may have a different shape than the input feature map. A local controller 750 within tensor processor unit 726 may, e.g., in conjunction with a shared cluster-level controller, such as shared cluster-level controller 730 illustrated in FIG. 7B, control the operation of the crossbars 738 and 748 and the flexible reduction module or multi-lane non-linearity unit 744, in accordance with the coarse-grained tensor instructions received from compiler 600 illustrated in FIG. 6 and/or fine-grained instructions received from the shared cluster-level controller 730.

In particular embodiments, the optional output buffer 742 stores intermediate outputs from one or more subarrays 740 such that partial results may be accumulated prior to passing them through a reduction module, thus reducing the scope and/or complexity of the reduction operation. In particular embodiment, the multi-lane non-linearity unit 744 is a flexible reduction module configurable to take an intermediate computation output from the subarrays 740 and perform a reduction (i.e., addition) of subarray outputs to produce an output for tensor processor unit 726 as a whole, where appropriate.

Figure 7D:
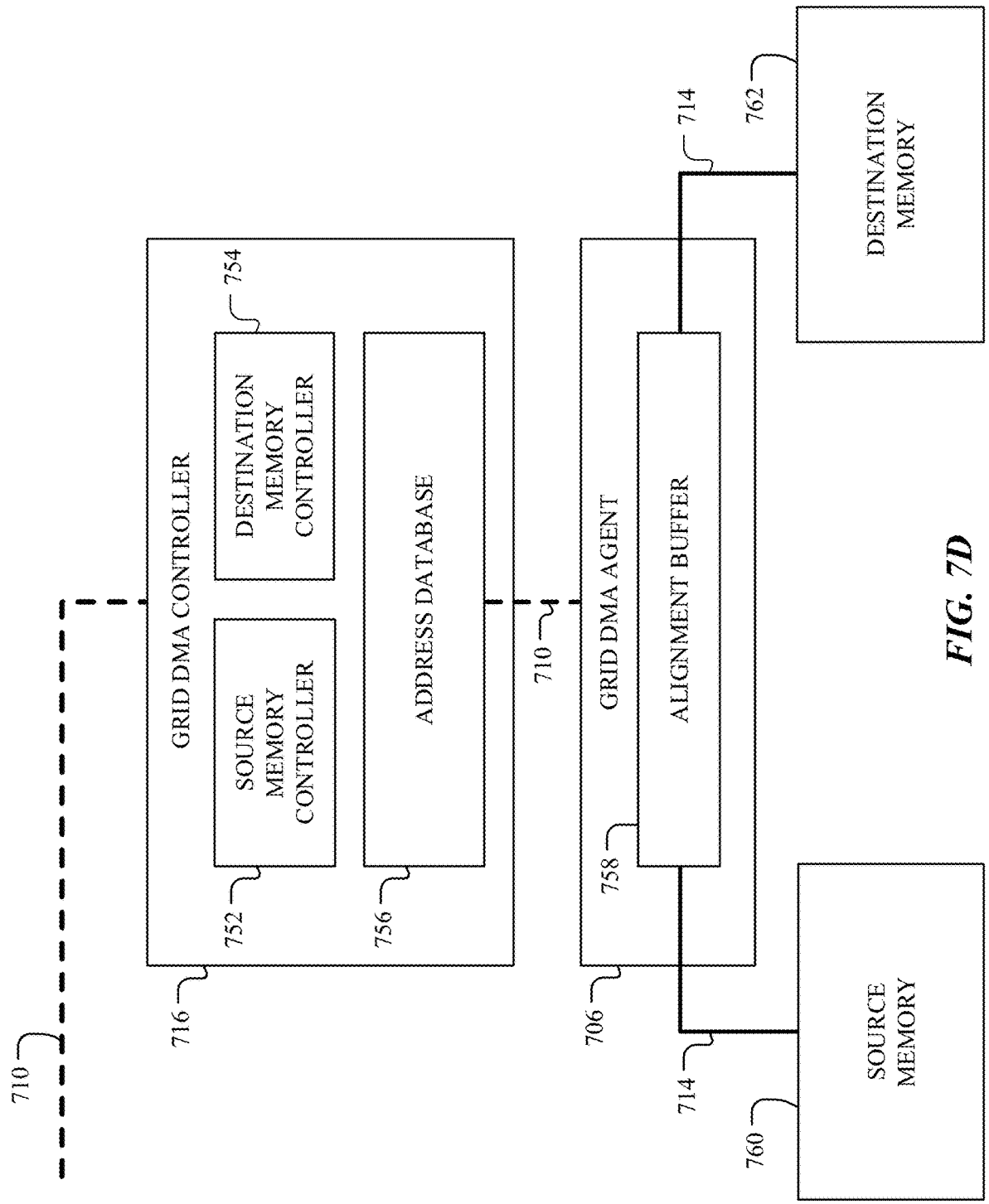
FIG. 7D illustrates selected elements of an example grid DMA controller and grid DMA agent.

FIG. 7D illustrates selected elements of an example grid DMA controller and grid DMA agent. In the example illustrated in FIG. 7D, grid DMA controller 716 may receive tensor instructions from the compiler over instruction bus 710. In one embodiment, each tensor instruction received by grid DMA controller 716 from the compiler may include instructions for reading a source tensor from source memory 760 and instructions for writing a destination tensor into destination memory 762. Specifically, the tensor instructions received by grid DMA controller 716 from the compiler may include respective source and destination loop instructions (e.g., for loops, while loops, do while loops, and the like), respective source and destination base addresses, and respective source and destination address increment values for each dimension of multi-dimensional source tensors and destination tensors. In one embodiment, tensor instructions received by grid DMA controller 716 from the compiler may additionally include a tensor data transfer size, or a "burst size," indicating a transfer size (e.g., in bytes) in which tensor data is to be transferred in one or more burst transmissions from source memory 760 to destination memory 762. In another embodiment, burst size may be determined by grid DMA agent 706 upon receiving source address and destination address pairs generated by grid DMA controller 716 (e.g., based on a largest contiguous block size of tensor data stored in source memory 760). In one embodiment, tensor instructions may additionally include one or more values indicating a maximum number of iterations associated with the source and destination loop instructions. Specifically, tensor instructions may include a "source rollover value" for each dimension of a multi-dimensional source tensor and a "destination rollover value" for each dimension of a multi-dimensional destination tensor. In other embodiments, tensor instructions received by grid DMA controller

716 from the compiler may include additional, fewer, or any number of instructions suitable for distributing tensor data. In the embodiment illustrated in FIG. 7D, grid DMA controller 716 includes a source memory controller 752, a destination memory controller 754, and an address database 756. Grid DMA agent 706 includes an alignment buffer 758 communicably coupled to source memory 760 and destination memory 762 via grid DMA bus 714.

In one embodiment, source memory 760 may comprise a system, device, or apparatus generally operable to store source tensors. In particular, source memory 760 may be used to store one or more multi-dimensional source tensors such that they may be read from source memory 760 at locations specified by source addresses generated by grid DMA controller 716. In one embodiment, tensor data corresponding to each dimension of a multi-dimensional source tensor may be stored contiguously in source memory 760. In this embodiment, burst size may be defined to accommodate a largest contiguous block size of tensor data stored in source memory 760 for optimal performance. In another embodiment, tensor data corresponding to each dimension of a multi-dimensional source tensor may be stored non-contiguously in source memory 760. In this embodiment, source address increment values may be used by grid DMA controller 716 to generate source addresses that are properly mapped to non-contiguous blocks within source memory 760 allocated to store a multi-dimensional source tensor. In one embodiment, source memory 760 may be or include shared RAM 708 as described above with respect to FIG. 7A. In another embodiment, source memory 760 may be or include activation memory 736 (illustrated in FIG. 7C) of a tensor processor unit 726 (illustrated in FIG. 7B) within a tensor processor cluster 724 as described above with respect to FIG. 7A.

In one embodiment, destination memory 762 may comprise a system, device, or apparatus generally operable to store destination tensors. Specifically, destination memory 762 may be used to store one or more multi-dimensional destination tensors at locations specified by destination addresses generated by grid DMA controller 716. In one embodiment, tensor data corresponding to each dimension of a multi-dimensional destination tensor may be stored contiguously in destination memory 762. In another embodiment, tensor data corresponding to each dimension of a multi-dimensional destination tensor may be stored non-contiguously in destination memory 762. In this embodiment, destination address increment values may be used by grid DMA controller 716 to generate destination addresses that are properly mapped to non-contiguous memory blocks within destination memory 762 allocated to store a multi-dimensional destination tensor. In one embodiment, destination memory 762 may be or include activation memory 736 (illustrated in FIG. 7C) of a tensor processor unit 726 (illustrated in FIG. 7B) within a tensor processor cluster 724 as described above with respect to FIG. 7A. In another embodiment, destination memory 762 may be or include shared RAM 708 as described above with respect to FIG. 7A.

In one embodiment, source memory controller 752 may comprise a system, device, or apparatus generally operable to iteratively generate source addresses indicating locations in source memory 760 where portions of a source tensor are stored. Source memory controller 752 may iteratively generate source addresses indicating locations in source memory 760 based on instructions for reading a source tensor from source memory 760 received from the compiler. Specifically, source memory controller 752 may execute a source loop instruction received by grid DMA controller 716 in tensor instructions sent from the compiler to iteratively generate source addresses. In one embodiment, source memory controller 752 may store the source addresses generated by the source loop instruction in address database 756. Here, source addresses generated by source memory controller 752 may be stored with destination addresses generated by destination memory controller 754 to form source address and destination address pairs. These source address and destination address pairs may be used by grid DMA agent 706 to transfer tensor data throughout ML accelerator 700. In another embodiment, source memory controller 752 may send source addresses generated by the source loop instruction directly to grid DMA agent 706, thereby bypassing address database 756. To iteratively generate the source addresses, source memory controller 752 may execute the example source loop instruction shown below.

```
srcAddr=srcBaseAddr
for x
  for y
    for z
      srcAddr+=srcAddrIncrZ
    srcAddr+=srcAddrIncrY
  srcAddr+=srcAddrIncrX
```

In the example source loop instruction shown above, the source base address (srcBaseAddr) may indicate a base address, or starting address, for a section of source memory 760 allocated for storing source tensors. In one embodiment, the source base address may be received by grid DMA controller 716 in tensor instructions sent from the compiler. In another embodiment, the source base address may be determined by grid DMA controller 716 and/or source memory controller 752. As shown in the example source loop instruction, the source base address may be assigned to a source address variable (srcAddr), thereby generating an initial source address. In one embodiment, this initial source address may be sent to grid DMA agent 706 such that grid DMA agent 706 may issue a read request comprising the initial source address and a burst size to read source tensor data from source memory 760. In another embodiment, this initial source address may be stored in address database 756.

Each iteration of the source loop instruction may increment the source address variable (srcAddr) by a source address increment value to generate a source address. As shown in the example source loop instruction above, source memory controller 752 may increment the source address variable (srcAddr) by a source address increment value (scrAddrIncrX, scrAddrIncrY, and scrAddrIncrZ) throughout multiple iterations of the source loop instruction for each dimension (e.g., x, y, and z dimensions) of a multi-dimensional source tensor stored in source memory 760. These multiple iterations may generate additional source addresses indicating locations in source memory 760 where portions of the source tensor are stored. In one embodiment, each of the additional source addresses may be sent to grid DMA agent 706 such that grid DMA agent 706 may issue read requests comprising the additional source addresses and the burst size to read source tensor data from source memory 760. In another embodiment, these additional source addresses may be stored in address database 756.

In one embodiment, destination memory controller 754 may comprise a system, device, or apparatus generally operable to iteratively generate destination addresses indicating locations in destination memory 762 where portions of a destination tensor are to be stored. Destination memory controller 754 may iteratively generate destination addresses indicating locations in destination memory 762 based on instructions for writing a destination tensor into destination memory 762 received from the compiler. Specifically, destination memory controller 754 may execute a destination loop instruction received by grid DMA controller 716 in tensor instructions sent from the compiler to iteratively generate destination addresses. In one embodiment, destination memory controller 754 may store the destination addresses generated by the destination loop instruction in address database 756. In this embodiment, destination addresses generated by destination memory controller 754 may be stored with source addresses generated by source memory controller 752 to form source address and destination address pairs. These source address and destination address pairs may be used by grid DMA agent 706 to transfer tensor data throughout ML accelerator 700. In another embodiment, destination memory controller 754 may send destination addresses generated by the destination loop instruction directly to grid DMA agent 706, thereby bypassing address database 756. To iteratively generate the destination addresses, destination memory controller 754 may execute the example destination loop instruction shown below.

destAddr=destBaseAddr
for x
  for y
    for z
      destAddr+=destAddrIncrZ
    destAddr+=destAddrIncrY
  destAddr+=destAddrIncrX In the example destination loop instruction shown above, the destination base address (destBaseAddr) may indicate a base address, or starting address, for a section of destination memory 762 allocated for storing destination tensors. In one embodiment, the destination base address may be received by grid DMA controller 716 in tensor instructions sent from the compiler. In another embodiment, the destination base address may be determined by grid DMA controller 716 and/or destination memory controller 754. As shown in the example destination loop instruction, the destination base address may be assigned to a destination address variable (destAddr), thereby generating an initial destination address. In one embodiment, this initial destination address may be sent to grid DMA agent 706 such that grid DMA agent 706 may issue a write request comprising the initial destination address and a burst size to write destination tensor data into destination memory 762. In another embodiment, this initial destination address may be stored in address database 756.

Each iteration of the destination loop instruction may increment the destination address variable (destAddr) by a destination address increment value to generate a destination address. As shown in the example destination loop instruction above, destination memory controller 754 may increment the destination address variable (destAddr) a by a destination address increment value (destAddrIncrX, destAddrIncrY, and destAddrIncrZ) throughout multiple iterations of the destination loop instruction for each dimension (e.g., x, y, and z dimensions) of a multi-dimensional destination tensor to be stored in destination memory 762. These multiple iterations may generate additional destination addresses indicating locations in destination memory 762 where portions of the destination tensor are to be stored. In one embodiment, each of the additional destination addresses may be sent to grid DMA agent 706 such that grid DMA agent 706 may issue write requests comprising the additional destination addresses and the burst size to write destination tensor data into destination memory 762. In another embodiment, these additional destination addresses may be stored in address database 756.

In some embodiments, multi-dimensional destination tensors may have equal, additional, fewer, and/or different dimensions than the multi-dimensional source tensors upon which they are derived. In one embodiment, a multi-dimensional destination tensor may be similar in dimension to a multi-dimensional source tensor, such that the respective dimensions are spatially identical. For example, grid DMA agent 706 may transmit a multi-dimensional source tensor from source memory 760 to destination memory 762 (via alignment buffer 758) in one or more burst transmissions such that the multi-dimensional source tensor is stored in destination memory 762 as a multi-dimensional destination tensor, equal in dimension to the source tensor. In another embodiment, the tensor data comprising a source tensor may be manipulated in various ways to properly align with a destination address before being stored in destination memory 762 to yield a destination tensor. For example, grid DMA agent 706 may temporarily store one or more portions of a source tensor in alignment buffer 758 to shift and merge the tensor data into alignment with destination addresses indicating locations in destination memory 762. In this way, grid DMA agent 706 supports an architecture in which source addresses indicating locations in source memory 760 and destination addresses indicating locations in destination memory 762 may be of arbitrary alignment in relation to one another. In yet another embodiment, a multi-dimensional source tensor may be spatially manipulated, or otherwise morphed, with respect to one or more dimensions (e.g., x, y, and z dimensions) of tensor data to yield a destination tensor having a different tensor shape than the source tensor. To spatially manipulate, or otherwise morph, a multi-dimensional source tensor, source memory controller 752 and destination memory controller 754 may respectively execute the example source loop instruction and destination loop instruction shown below.

srcAddr=srcBaseAddr
for x
  for y
    for z
      srcAddr+=srcAddrIncrZ
    srcAddr+=srcAddrIncrY
  srcAddr+=srcAddrIncrX
destAddr=destBaseAddr
for z
  for x
    for y
      destAddr+=destAddrIncrY
    destAddr+=destAddrIncrX
  destAddr+=destAddrIncrZ In the example source loop instruction shown above, the source base address (srcBaseAddr) may be assigned to a source address variable (srcAddr) to generate an initial source address. Source memory controller 752 may increment the source address variable (srcAddr) by a source address increment value (scrAddrIncrX, scrAddrIncrY, and scrAddrIncrZ) throughout multiple iterations of the source loop instruction for each dimension (e.g., x, y, and z dimensions) of the multi-dimensional source tensor stored in source memory 760 to generate additional source addresses as described above. Similarly, the destination base address (destBaseAddr) may be assigned to a destination address variable (destAddr) to generate an initial destination address. However, destination memory controller 754 may increment the destination address variable (destAddr) by destination address increment values (destAddrIncrX, destAddrIncrY, and destAddrIncrZ) throughout multiple iterations of the destination loop instruction for each dimension (e.g., x, y, and z dimensions) of the multi-dimensional destination tensor such that the destination address increment values do not coincide with the source address increment values. That is, an order in which destination address increment values are used to increment the destination address variable with respect to each dimension of the multi-dimensional destination tensor does not coincide with the order in which source address increment values are used to increment the source address variable with respect to each dimension of the multi-dimensional source tensor. This is shown in the example source loop instruction and destination loop instruction above where the source address variable (srcAddr) is incremented in an order of scrAddrIncrZ, scrAddrIncrY, and scrAddrIncrX and the destination address variable (destAddr) is incremented in an order of scrAddrIncrY, scrAddrIncrX, and scrAddrIncrZ. Therefore, the source address and destination address pairs generated by grid DMA controller 716 may cause grid DMA agent 706 to transmit x, y, and z dimensions of a source tensor out of order, instead transmitting z, x, and y dimensions to yield a destination tensor having a different orientation of x, y, and z dimensions than those the source tensor. In this way, a user may define advanced multi-dimensional tensor shape-shifting (e.g., tensor transpose) by assigning different values of one or more dimensions between source loop instructions and destination loop instructions provided that the total number of iterations between the source loop instructions and destination loop instructions remains the same.

In one embodiment, address database 756 may comprise a system, device, or apparatus generally operable to store source address and destination address pairs generated by grid DMA controller 716. In particular, address database 756 may be communicably coupled to grid DMA agent 706 over instruction bus 710 such that grid DMA agent 706 may receive source address and destination address pairs generated by grid DMA controller 716. In one embodiment, source address and destination address pairs generated by grid DMA controller 716 may be stored in address database 756 such that grid DMA agent 706 may retrieve address pairs as needed for tensor data distribution. For example, grid DMA agent 706 may retrieve a new source address and destination address pair from address database 756 upon completing one or more burst transmissions of tensor data using a source address and destination address pair previously retrieved from address database 756. In another embodiment, grid DMA controller 716 may provide generated source address and destination address pairs directly to grid DMA agent 706 over instruction bus 710, thereby bypassing address database 756. In one embodiment, address database 756 may be or include a relational database in which each address pair generated by grid DMA controller 716 is stored as an entry. In other embodiments, address database 756 may be or include a centralized database, distributed database, commercial database, operational database, and/or any other database management system suitable for storing source address and destination address pairs.

In one embodiment, grid DMA agent 706 may comprise a system, device, or apparatus generally operable to distribute tensor data in one or more burst transmissions according to source address and destination address pairs generated by grid DMA controller 716. As described above with respect to FIG. 7A, grid DMA agent 706 may receive source address and destination address pairs generated by grid DMA controller 716 over instruction bus 710 and use the source address and destination address pairs to transmit tensor data in one or more burst transmissions from a source address to a destination address. For example, grid DMA agent 706 may transmit tensor data in one or more burst transmissions from a source address in source memory 760 to a destination address in destination memory 762 via alignment buffer 758. In one embodiment, grid DMA agent 706 may determine a burst size indicating a transfer size (e.g., in bytes) in which tensor data is to be transferred in one or more burst transmissions from source memory 760 to destination memory 762. In the embodiment illustrated in FIG. 7D, grid DMA agent 706 may then issue a read request to source memory 760 that includes the source address and the burst size. Here, grid DMA agent 706 may read a portion of a source tensor in one or more burst transmissions from the source address in source memory 760 according to the burst size. Once read from source memory 760, grid DMA agent 706 may temporarily store the source tensor into alignment buffer 758 to ensure that the source tensor is aligned with a destination address, or destination addresses, prior to being stored in destination memory 762. If the source tensor is unaligned with the destination address, grid DMA agent 706 may shift the source tensor in alignment buffer 758 to align with the destination address, or destination addresses. If alignment is not required, grid DMA agent 706 may simply store the source tensor in alignment buffer 758 prior to issuing a write request to destination memory 762. Grid DMA agent 706 may then issue a write request to destination memory 762 that includes the destination address and the burst size. That is, grid DMA agent 706 may write a portion of tensor data (i.e., a destination tensor) in one or more burst transmissions from alignment buffer 758 to destination memory 762 according to the burst size.

In one embodiment, alignment buffer 758 may comprise a system, device, or apparatus generally operable to temporarily store, or buffer, tensor data (e.g., a destination tensor comprised of aligned or unaligned source tensor data) such that, if unaligned, the tensor data may be aligned with a destination address, or destination addresses, before the tensor data is stored in destination memory 762. In one embodiment, tensor data may be unaligned with respect to bus width. For example, a source tensor may be stored in source memory 760 starting at a source address that is unaligned with a bus width of grid DMA bus 714. In another embodiment, source addresses indicating locations in source memory 760 may be unaligned with respect to destination addresses indicating locations in destination memory 762. For example, a source address and destination address pair generated by grid DMA controller 716 may include a source address having an offset in source memory 760 greater than or less than an offset of a destination address in destination memory 762 with respect to a source base address and a destination base address. Grid DMA agent 706 may use alignment buffer 758 to temporarily store tensor data and to shift the tensor data to align with a destination address, or destination addresses, if needed prior to transmitting the tensor data to destination memory 762 in one or more burst transmissions. In this way, grid DMA agent 706 supports an architecture in which source addresses indicating locations in source memory 760 and destination addresses indicating locations in destination memory 762 may be of arbitrary alignment in relation to one another. It is noted that although a single alignment buffer is shown in the example embodiment illustrated in FIG. 8, other embodiments of ML accelerator 700 may include any number of alignment buffers suitable for temporarily storing, shifting, and merging tensor data. Alignment buffer 758 is described in further detail with respect to FIG. 8.

In one embodiment, tensor data may be unaligned with respect to bus width. Specifically, a source tensor may span one or more contiguous blocks in source memory 760 such that the tensor data comprising the source tensor is unaligned with respect to a bus width of grid DMA bus 714. For example, a 64-byte source tensor stored in source memory 760 may be comprised of tensor data that starts at source address 16 (rather than source address 0) and ends at source address 79 (rather than source address 63). Here, grid DMA bus 714 may have a bus width of 32 bytes. Because the tensor data starts at source address 16 rather than source address 0, the 64-byte source tensor is unaligned with the 32-byte bus width of grid DMA bus 714. Thus, the 64-byte source tensor may require three clock cycles, or "beats," to transfer three portions of the source tensor to destination memory 762 (i.e., one beat to transfer bytes 0 to 31, one beat to transfer bytes 32 to 63, and one beat to transfer bytes 64 to 95) rather than two beats (i.e., one beat to transfer bytes 0 to 31 and one beat to transfer bytes 32 to 63). Here, grid DMA agent 706 may simply store each of the three portions of tensor data in alignment buffer 758 before transmitting the three portions to destination memory 762 in one or more burst transmissions. In this embodiment, although the tensor data may be unaligned with the bus width of grid DMA bus 714, grid DMA agent 706 may simply partition, or chop, the source tensor into three portions to accommodate the bus width of 32 bytes without shifting, or otherwise manipulating, the tensor data stored in alignment buffer 758.

In one embodiment, source addresses indicating locations in source memory 760 may be unaligned with respect to destination addresses indicating locations in destination memory 762. In particular, a source tensor may span one or more contiguous blocks in source memory 760 starting at a source address that is unaligned with a destination address in destination memory 762. For example, a 32-byte source tensor may be stored in source memory 760 starting at source address 16 and ending at source address 47. However, a destination address generated by destination memory controller 754 may indicate that the 32-byte source tensor is to be stored in destination memory 762 starting at destination address 0 and ending at destination address 31. Here, grid DMA bus 714 may have a bus width of 32 bytes. When operating within an architecture that supports burst mode, grid DMA agent 706 may issue a single read request to source memory 760 starting at source address 16 and specifying a burst size of 32 bytes. Here, grid DMA agent 706 may transfer two portions of the 32-byte source tensor to alignment buffer 758 in a single 32-byte burst transmission having two beats (i.e., one beat to transfer bytes 0 to 31 and one beat to transfer bytes 32 to 63). Once transferred to alignment buffer 758, grid DMA agent 706 may shift out the unwanted bytes from the first portion (i.e., bytes 0 to 15) and the second portion (i.e., bytes 48 to 63) from the burst transmission and merge the two portions into a single 32-byte portion of tensor data. Once merged, grid DMA agent 706 may issue a single write request for a 32-byte burst transmission to destination memory 762 starting at destination address 0. In this embodiment, because the source address and destination address are unaligned with respect to one another, grid DMA agent 706 may use alignment buffer 758 to store one or more portions of a source tensor, shift out unwanted portions from the one or more portions of the source tensor, and merge the one or more portions of the source tensor into a single portion of tensor data for transmission to destination memory 762. Alignment buffer is described in further detail with respect to FIG. 8.

Figure 8:
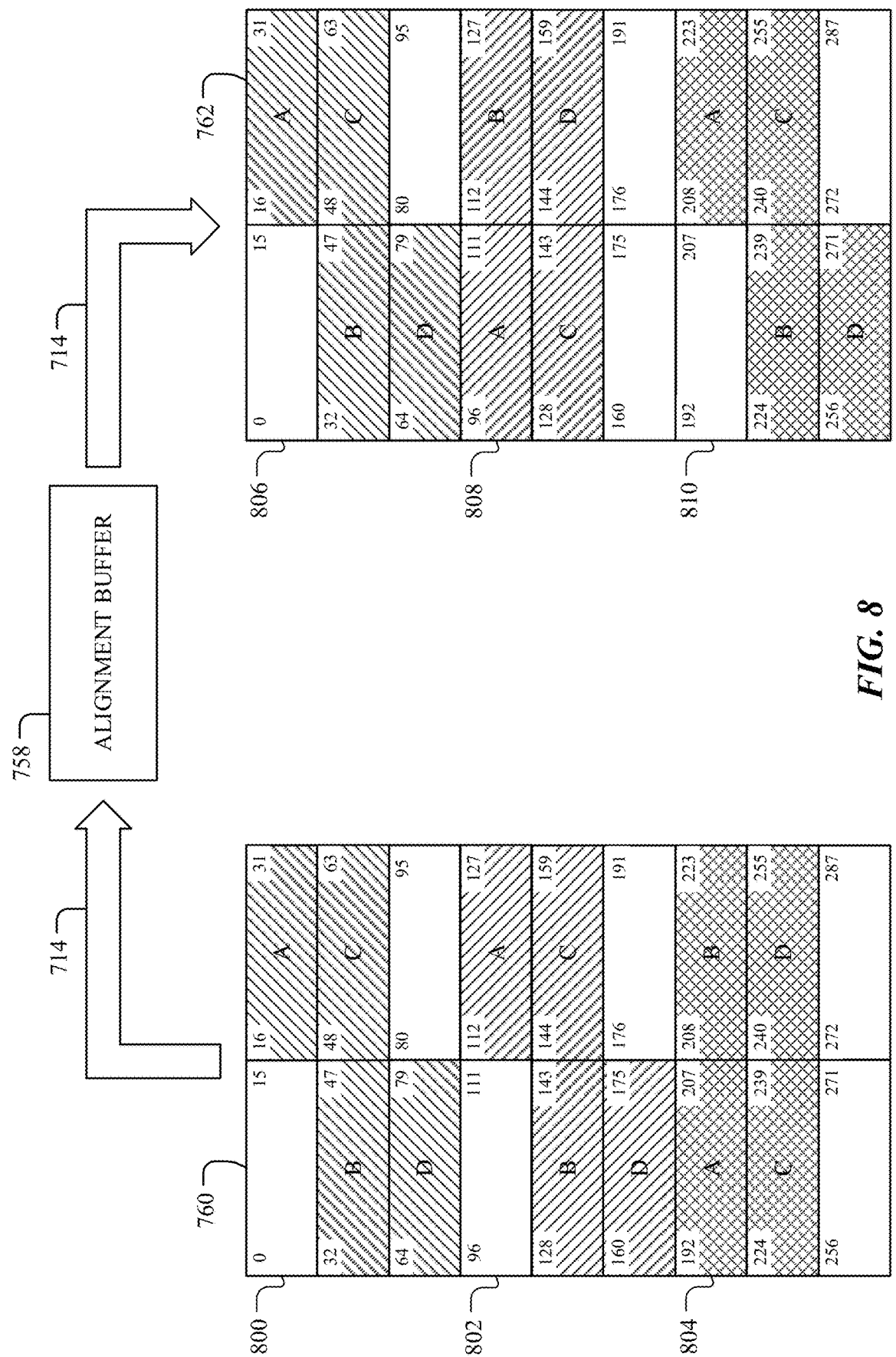
FIG. 8 illustrates selected elements of an example tensor data transfer from source memory to destination memory.

FIG. 8 illustrates selected elements of an example tensor data transfer from source memory to destination memory. In the example illustrated in FIG. 8, source memory 760 includes portions of multi-dimensional source tensor data. Specifically, source memory 760 includes three 64-byte portions of a source tensor corresponding to x, y, and z dimensions stored in source memory 760. Here, source tensor data corresponding to the x dimension 800 is stored in source memory 760 from source address 16 to source address 79. Similarly, source tensor data corresponding to the y dimension 802 is stored in source memory from source address 112 to source address 175. Source tensor data corresponding to the z dimension 804 is stored in source memory 760 from source address 192 to source address 255. Source base address is 0. In the embodiment illustrated in FIG. 8, grid DMA agent 706 may transmit each of the three 64-byte portions of the source tensor from source memory 760 to destination memory 762 via alignment buffer 758. That is, grid DMA agent 706 may transmit source tensor data corresponding to each of the x, y, and z dimensions stored in source memory 760 to respective destination addresses in destination memory 762. This is shown in FIG. 8 where destination memory 762 includes three 64-byte portions of a destination tensor (i.e., comprised of the source tensor data from source memory 760) each corresponding to the x, y, and z dimensions shown in source memory 760. Specifically, destination tensor data corresponding to the x dimension 806 is stored in destination memory 762 from destination address 16 to destination address 79. Destination tensor data corresponding to they dimension 808 is stored in destination memory 762 from destination address 96 to destination address 159. Destination tensor data corresponding to the z dimension 810 is stored in destination memory 762 from destination address 208 to destination address 271. Destination base address is 0. Bus width of grid DMA bus 714 is 32 bytes.

In the embodiment illustrated in FIG. 8, source tensor data corresponding to the x dimension 800 is stored in source memory 760 from source address 16 to source address 79. This 64-byte portion of the multi-dimensional source tensor has an offset of 16 bytes in relation to source base address 0, thereby causing the source tensor data to be unaligned with the 32-byte bus width of grid DMA bus 714. In this example, source memory controller 752 may generate one or more source addresses using the source loop instruction as described above with respect to FIG. 7D. Specifically, source memory controller 752 may generate source address 16, indicating that a first portion of the multi-dimensional source tensor (portion A) corresponding to the x dimension 800 is stored at source address 16. Similarly, destination memory controller 754 may generate one or more destination addresses using the destination loop instruction as described above with respect to FIG. 7D. In particular, destination memory controller 754 may generate destination address 16, indicating that a first portion of a multi-dimensional destination tensor (portion A) corresponding to the x dimension 806 is to be stored at destination address 16. Thus, grid DMA agent 706 may receive a source address and destination address pair from grid DMA controller 716, or retrieve a source address and destination address pair from address database 756 (illustrated in FIG. 7D), comprised of source address 16 and destination address 16.

However, because the source tensor data starts at source address 16 rather than source address 0, the source tensor data is unaligned with the 32-byte bus width of grid DMA bus 714. Thus, rather than using two beats to transfer the source tensor data (i.e., one beat to transfer bytes 0 to 31 and one beat to transfer bytes 32 to 63), the 64-byte portion of the source tensor may require three beats to transfer the source tensor data to alignment buffer 758 in 32-byte portions to accommodate the 32-byte bus width of grid DMA bus 714. That is, grid DMA agent 706 may use one beat to transfer bytes 0 to 31 (including portion A), one beat to transfer bytes 32 to 63 (portions B and C), and one beat to transfer bytes 64 to 95 (including portion D). In architectures that support a burst mode, grid DMA agent 706 may issue a single read request to source memory 760 having a burst size of 64 bytes. In architectures that do not support a burst mode, grid DMA agent 706 may issue three respective read requests to source memory 760 starting at source addresses 0, 32, and 64.

Because source addresses and destination addresses are aligned with respect to one another, grid DMA agent 706 may simply store the source tensor data in alignment buffer 758 before transmitting the source tensor data to destination memory 762 in a 64-byte burst transmission. The 64-byte burst transmission to destination memory 762 may require three beats where one beat is used to transfer bytes 0 to 31 (including portion A), one beat is used to transfer bytes 32 to 63 (portions B and C), and one beat is used to transfer bytes 64 to 95 (including portion D). That is, although the source tensor data may be unaligned with the bus width of grid DMA bus 714, grid DMA agent 706 may simply partition, or chop, the tensor data into three 32-byte portions to accommodate the bus width of 32 bytes without shifting, or otherwise manipulating, the tensor data stored in alignment buffer 758. This is shown in FIG. 8 where portions A, B, C, and D of the source tensor stored in source memory 760 each correspond to portions A, B, C, and D of the destination tensor stored in destination memory 762. In addition, although the unaligned tensor data may cause additional beats to complete the tensor data transfer, having a large burst size of 64-bytes allows grid DMA agent 706 to maximize throughput for the transmission of portions B and C (utilizing 100% of the available bus width), thereby compensating for the underutilization of bus width for the respective transmissions of portion A and portion D (utilizing only 50% of the available bus width) to optimize performance.

In the embodiment illustrated in FIG. 8, source tensor data corresponding to the y dimension 802 is stored in source memory 760 from source address 112 to source address 175. This 64-byte portion of the multi-dimensional source tensor has an offset of 16 bytes in relation to source address 96, thereby causing the source tensor data to be unaligned with the 32-byte bus width of grid DMA bus 714 as described above. In this example, source memory controller 752 may generate source address 112, indicating that a first portion of the multi-dimensional source tensor (portion A) corresponding to the y dimension 802 is stored at source address 112 (with a 16-byte offset). In addition, destination memory controller 754 may generate destination address 96, indicating that a first portion of the multi-dimensional destination tensor (portion A) corresponding to the y dimension 808 is to be stored at destination address 96. Therefore, a source address and destination address pair generated by grid DMA controller 716 may be comprised of source address 112 and destination address 96. Here, source address 112 has a greater offset than destination address 96 (i.e., greater by 16 bytes), thereby causing the source address and destination address to be unaligned with respect to one another.

Because the source tensor data starts at source address 112 rather than source address 96, the source tensor data is unaligned with the 32-byte bus width of grid DMA bus 714 as described above with respect to the source tensor data corresponding to the x dimension 800. Similar to the tensor data transfer for the x dimension 800, the 64-byte portion of the source tensor may require three beats to transfer the source tensor data to alignment buffer 758 in 32-byte portions to accommodate the 32-byte bus width of grid DMA bus 714. Here, grid DMA agent 706 may use one beat to transfer bytes 96 to 127 (including portion A), one beat to transfer bytes 128 to 159 (portions B and C), and one beat to transfer bytes 160 to 191 (including portion D). In architectures that support a burst mode, grid DMA agent 706 may issue a single read request to source memory 760 having a burst size of 64 bytes. In architectures that do not support a burst mode, grid DMA agent 706 may issue three respective read requests to source memory 760 starting at source addresses 96, 128, and 160.

However, because source address 112 and destination address 96 are unaligned with respect to one another, grid DMA agent 706 may use alignment buffer 758 to store the source tensor data corresponding to the y dimension 802, shift out unwanted bytes, and merge the tensor data together for transmission to destination memory 762. Specifically, grid DMA agent 706 may shift out unwanted bytes from source address 96 to 111 (transferred in the first beat) and shift portion A into their place within alignment buffer 758. Next, grid DMA agent 706 may shift portion B (transferred in the second beat) to merge with portion A, thereby forming a 32-byte portion of tensor data comprised of portions A and B. Similarly, grid DMA agent 706 may shift out unwanted bytes from source address 176 to 191 (transferred in the third beat) and shift portion D into their place within alignment buffer 758. Grid DMA agent 706 may then shift portion C (transferred in the second beat) to merge with portion D, thereby forming a 32-byte portion of tensor data comprised of portions C and D. Once shifted and merged, grid DMA agent 706 may issue a single write request to destination memory 762 starting at destination address 96 and specifying a burst size of 64 bytes. Here, grid DMA agent 706 may transfer two 32-byte portions of the 64-byte tensor data stored in alignment buffer 758 in a 64-byte burst transmission having two beats (i.e., one beat to transfer the 32-byte portion of tensor data comprised of portions A and B and one beat to transfer the 32-byte portion of tensor data comprised of portions C and D).

In the embodiment illustrated in FIG. 8, source tensor data corresponding to the z dimension 804 is stored in source memory 760 from source address 192 to source address 255. This 64-byte portion of the multi-dimensional source tensor has an offset of zero, thus the source tensor data is aligned with the 32-byte bus width of grid DMA bus 714. In this example, source memory controller 752 may generate source address 192, indicating that a first portion of the multi-dimensional source tensor (portion A) corresponding to the z dimension 804 is stored at source address 192. Additionally, destination memory controller 754 may generate destination address 208, indicating that a first portion of the multi-dimensional destination tensor (portion A) corresponding to the z dimension 810 is to be stored at destination address 208. Therefore, a source address and destination address pair generated by grid DMA controller 716 may be comprised of source address 192 and destination address 208. Here destination address 208 has a greater offset than source address 192 (i.e., greater by 16 bytes), thereby causing the source address and destination address to be unaligned with respect to one another.

Because source address 192 and destination address 208 are unaligned with respect to one another, grid DMA agent 706 may again use alignment buffer 758 to temporarily store the source tensor data corresponding to the z dimension 804 and to shift the tensor data to align with the destination address prior to transmitting the tensor data to destination memory 762. Here, the 64-byte portion of the source tensor may require only two beats to transfer the source tensor data to alignment buffer 758 in 32-byte portions to accommodate the 32-byte bus width of grid DMA bus 714. Grid DMA agent 706 may use one beat to transfer bytes 192 to 223 (portions A and B) and one beat to transfer bytes 224 to 255 (portions C and D). In architectures that support a burst mode, grid DMA agent 706 may issue a single read request to source memory 760 having a burst size of 64 bytes. In architectures that do not support a burst mode, grid DMA agent 706 may issue two respective read requests to source memory 760 starting at source addresses 192 and 224. Grid DMA agent 706 may then shift and merge portions A, B, C, and D of the tensor data stored in alignment buffer 758 to align with destination address 208 as described above with respect to the y dimension 802. Once shifted and merged, grid DMA agent 706 may issue a single write request to destination memory 762 starting at destination address 208 and specifying a burst size of 64 bytes. Here, grid DMA agent 706 may transfer three portions of the 64-byte tensor data stored in alignment buffer 758 in a 64-byte burst transmission having three beats (i.e., one beat to transfer portion A, one beat to transfer portions B and C, and one beat to transfer portion D).

Figure 9:
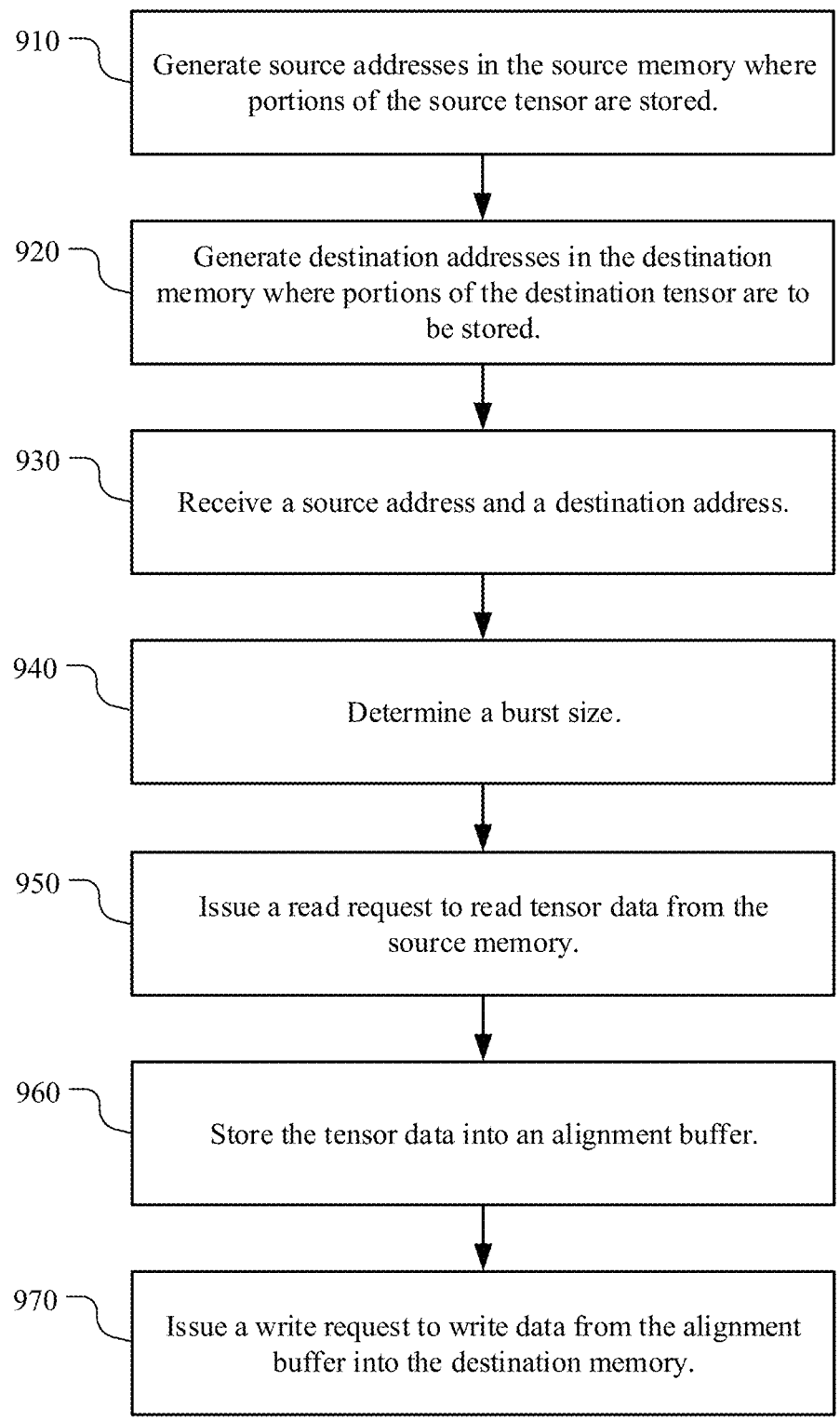
FIG. 9 illustrates selected elements of an example method for tensor data distribution using a DMA agent.

FIG. 9 illustrates selected elements of an example method for tensor data distribution using a DMA agent. The method may begin at step 910, where a first controller may generate source addresses indicating locations in a source memory where portions of a source tensor are stored. The first controller may generate source addresses based on tensor instructions received from a compiler for reading a source tensor from the source memory. For example, source memory controller 752 may generate source addresses indicating locations in source memory 760 as shown in FIG. 7D. At step 920, a second controller may generate destination addresses indicating locations in a destination memory where portions of a destination tensor are to be stored. Here, the second controller may generate destination addresses based on tensor instructions received from the compiler for writing a destination tensor into the destination memory. For example, destination memory controller 754 may generate destination addresses indicating locations in destination memory 762 as shown in FIG. 7D. At step 930, a DMA agent may receive a source address generated by the first controller and a destination address generated by the second controller. For example, grid DMA agent 706 may receive a source address and destination address pair generated by grid DMA controller 716 as shown in FIG. 7D. At step 940, the DMA agent may determine a burst size associated with one or more burst transmissions for sending tensor data from the source memory to the destination memory. For example, grid DMA agent 706 may determine a burst size based on tensor instructions received over instruction bus 710 as shown in FIG. 7D. At step 950, the DMA agent may issue a read request comprising the source address and the burst size to read tensor data from the source memory. For example, grid DMA agent 706 may read a source tensor from source memory 760 at the source address according to the burst size. At step 960, the DMA agent may store the tensor data into an alignment buffer. For example, grid DMA agent 706 may store a source tensor from source memory 760 into alignment buffer 758 as shown in FIG. 7D. At step 970, the DMA agent may issue a write request comprising the destination address and the burst size to write data from the alignment buffer into the destination memory. For example, grid DMA agent 706 may write a destination tensor from alignment buffer 758 into destination memory 762 as shown in FIG. 7D.

Figure 10:
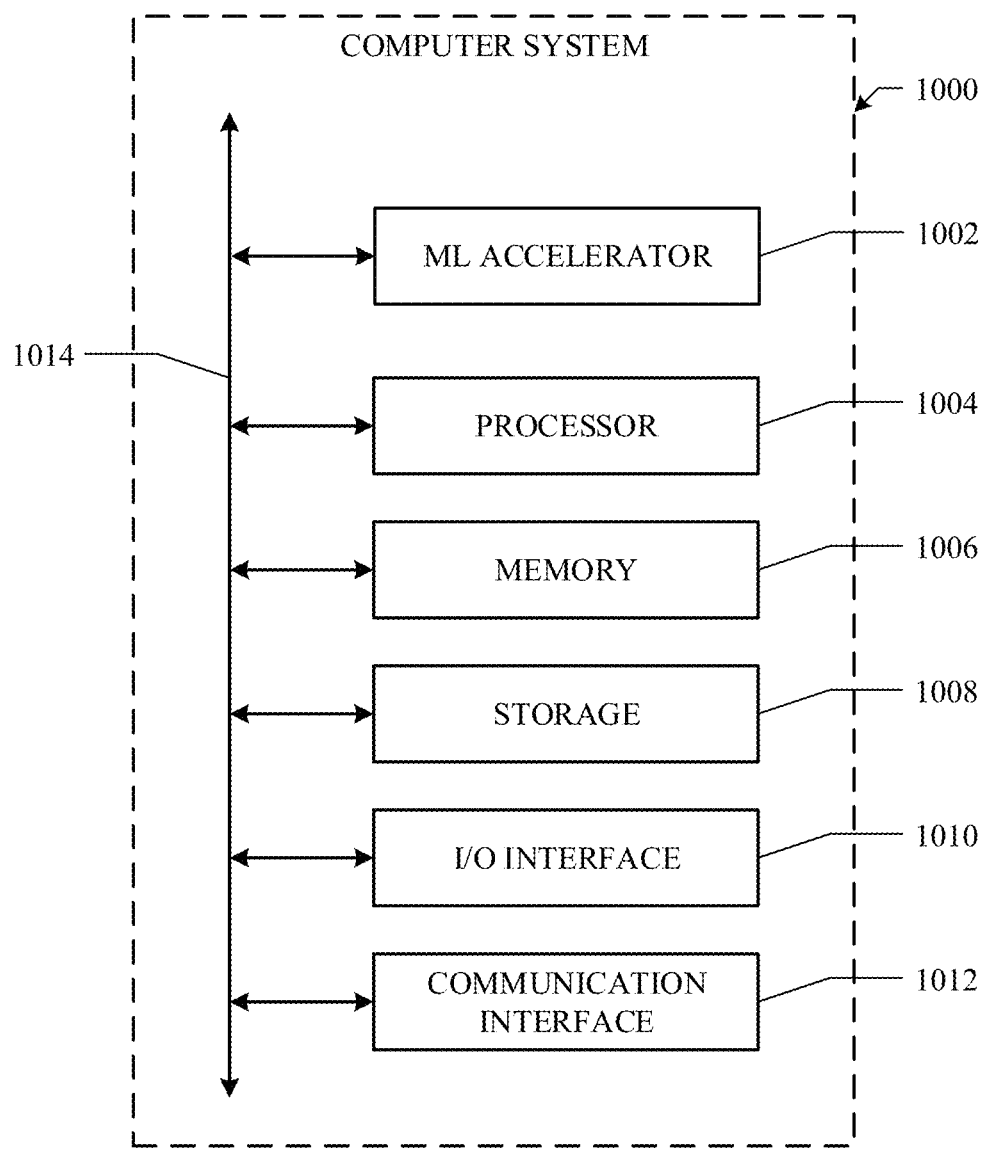
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an AR/VR reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example, and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1004, memory 1006, storage 1008, an input/output (I/O) interface 1010, a communication interface 1012, a bus 1014, and an ML accelerator 1002. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1004 includes hardware for executing instructions, such as those making up a computer program. As an example, and not by way of limitation, to execute instructions, processor 1004 may retrieve (or fetch) the instructions from an internal register, an internal cache, memory 1006, or storage 1008; decode and execute them; and then write one or more results to an internal register, an internal cache, memory 1006, or storage 1008. In particular embodiments, processor 1004 may include one or more internal caches for data, instructions, or addresses. This disclosure contemplates processor 1004 including any suitable number of any suitable internal caches, where appropriate. As an example, and not by way of limitation, processor 1004 may include one or more instruction caches, one or more data caches, and one or more translation lookaside buffers (TLBs). Instructions in the instruction caches may be copies of instructions in memory 1006 or storage 1008, and the instruction caches may speed up retrieval of those instructions by processor 1004. Data in the data caches may be copies of data in memory 1006 or storage 1008 for instructions executing at processor 1004 to operate on; the results of previous instructions executed at processor 1004 for access by subsequent instructions executing at processor 1004 or for writing to memory 1006 or storage 1008; or other suitable data. The data caches may speed up read or write operations by processor 1004. The TLBs may speed up virtual-address translation for processor 1004. In particular embodiments, processor 1004 may include one or more internal registers for data, instructions, or addresses. This disclosure contemplates processor 1004 including any suitable number of any suitable internal registers, where appropriate. Where appropriate, processor 1004 may include one or more arithmetic logic units (ALUs); be a multi-core processor; or include one or more processors 1004. Although this disclosure describes and illustrates a particular processor, this disclosure contemplates any suitable processor.

In particular embodiments, ML accelerator 1002 may be similar to ML accelerator 614 illustrated in FIG. 6, or ML accelerator 700 illustrated in FIG. 7A. As such, particular instructions of computer programs for machine learning applications that use a convolutional neural network may be translated into tensor instructions for execution by various computational elements of ML accelerator 1002, as described herein. In particular embodiments, ML accelerator 1002 may be implemented using hardware and/or software elements in any suitable combination. As described herein, ML accelerator 1002 may include multiple tensor processor clusters and underlying tensor processor units, each of which may include local memory for storing input features, weights for 2D kernels of various multi-dimensional filters, and/or output features of various convolution operations. In particular embodiments, these local memories may be loaded from storage 1008, memory 1006, or from another source (such as, for example, another computer system 1000). The use of ML accelerator 1002 to execute the tensor instructions may improve the overall performance and resource utilization of computer system 1000 for those applications when compared to executing them using processor 1004 or using an existing ML accelerator.

In particular embodiments, memory 1006 includes main memory for storing instructions for processor 1004 to execute or data for processor 1004 to operate on. As an example, and not by way of limitation, computer system 1000 may load instructions from storage 1008 or another source (such as, for example, another computer system 1000) to memory 1006. Processor 1004 may then load the instructions from memory 1006 to an internal register or internal cache. To execute the instructions, processor 1004 may retrieve the instructions from the internal register or internal cache and decode them. During or after execution of the instructions, processor 1004 may write one or more results (which may be intermediate or final results) to the internal register or internal cache. Processor 1004 may then write one or more of those results to memory 1006. In particular embodiments, processor 1004 executes only instructions in one or more internal registers or internal caches or in memory 1006 (as opposed to storage 1008 or elsewhere) and operates only on data in one or more internal registers or internal caches or in memory 1006 (as opposed to storage 1008 or elsewhere). One or more memory buses (which may each include an address bus and a data bus) may couple processor 1004 to memory 1006. Bus 1014 may include one or more memory buses, as described below. In particular embodiments, one or more memory management units (MMUs) reside between processor 1004 and memory 1006 and facilitate accesses to memory 1006 requested by processor 1004. In particular embodiments, memory 1006 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1006 may include one or more memories 1006, where appropriate. Although this disclosure describes and illustrates particular memory, this disclosure contemplates any suitable memory.

In particular embodiments, storage 1008 includes mass storage for data or instructions. As an example, and not by way of limitation, storage 1008 may include a hard disk drive (HDD), a floppy disk drive, flash memory, an optical disc, a magneto-optical disc, magnetic tape, or a Universal Serial Bus (USB) drive or a combination of two or more of these. Storage 1008 may include removable or non-removable (or fixed) media, where appropriate. Storage 1008 may be internal or external to computer system 1000, where appropriate. In particular embodiments, storage 1008 is non-volatile, solid-state memory. In particular embodiments, storage 1008 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1008 taking any suitable physical form. Storage 1008 may include one or more storage control units facilitating communication between processor 1004 and storage 1008, where appropriate. Where appropriate, storage 1008 may include one or more storages 1008. Although this disclosure describes and illustrates particular storage, this disclosure contemplates any suitable storage.

In particular embodiments, I/O interface 1010 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1010 for them. Where appropriate, I/O interface 1010 may include one or more device or software drivers enabling processor 1004 to drive one or more of these I/O devices. I/O interface 1010 may include one or more I/O interfaces 1010, where appropriate. Although this disclosure describes and illustrates a particular I/O interface, this disclosure contemplates any suitable I/O interface.

In particular embodiments, communication interface 1012 includes hardware, software, or both providing one or more interfaces for communication (such as, for example, packet-based communication) between computer system 1000 and one or more other computer systems 1000 or one or more networks. As an example, and not by way of limitation, communication interface 1012 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1012 for it. As an example, and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1012 for any of these networks, where appropriate. Communication interface 1012 may include one or more communication interfaces 1012, where appropriate. Although this disclosure describes and illustrates a particular communication interface, this disclosure contemplates any suitable communication interface.

In particular embodiments, bus 1014 includes hardware, software, or both coupling components of computer system 1000 to each other. As an example, and not by way of limitation, bus 1014 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1014 may include one or more buses 1014, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A machine learning accelerator computing system for accelerating machine-learning computations, comprising:
   one or more processors;
   one or more computer-readable non-transitory storage media coupled to one or more of the processors;
   an apparatus for a direct-memory access controller comprising:
   a first controller configured to iteratively generate, based on instructions for reading a source tensor from a source memory, source addresses indicating locations in the source memory where portions of the source tensor are stored; and
   a second controller configured to iteratively generate, based on instructions for writing a destination tensor into a destination memory, destination addresses indicating locations in the destination memory where portions of the destination tensor are to be stored; and
   an apparatus for a direct-memory access agent, which is communicably coupled to the direct-memory access controller over an instruction bus, configured to:
   receive a source address generated by the first controller and a destination address generated by the second controller;
   determine a burst size;
   issue a read request comprising the source address and the burst size to read tensor data from the source memory;
   store the tensor data into an alignment buffer; and issue a write request comprising the destination address and the burst size to write data from the alignment buffer into the destination memory.

2. The computing system of claim 1, wherein the instructions for reading the source tensor from the source memory include:
- a source loop instruction to be executed by the first controller, the source loop instruction causing the first controller to iteratively generate the source addresses;
- a source base address indicating a location in the source memory where a first portion of the source tensor is stored; and
- one or more source address increment values, each of the one or more source address increment values associated with a dimension of one or more dimensions comprising the source tensor.

3. The computing system of claim 2, wherein to iteratively generate the source addresses, the first controller is further configured to:
- receive the instructions for reading the source tensor from the source memory; and
- increment, using the source loop instruction, the source base address by the one or more address increment values for each dimension of the one or more dimensions.

4. The computing system of claim 1, wherein the instructions for writing the destination tensor into the destination memory include:
- a destination loop instruction to be executed by the second controller, the destination loop instruction causing the second controller to iteratively generate the destination addresses;
- a destination base address indicating a location in the destination memory where a first portion of the destination tensor is to be stored; and
- one or more destination address increment values, each of the one or more destination address increment values associated with a dimension of one or more dimensions comprising the destination tensor.

5. The computing system of claim 4, wherein to iteratively generate the destination addresses, the second controller is further configured to:
- receive the instructions for writing the destination tensor into the destination memory; and
- increment, using the destination loop instruction, the destination base address by the one or more address increment values for each dimension of the one or more dimensions.

6. The computing system of claim 1, wherein to write the data from the alignment buffer into the destination memory, the direct-memory access agent is further configured to:
- shift the data in the alignment buffer to align with the destination address; and
- transmit the data from the alignment buffer to the destination memory in one or more burst transmissions according to the burst size.

7. The computing system of claim 1, wherein the source memory is a shared memory of the machine learning accelerator and the destination memory is an activation memory of a tensor processor unit of the machine learning accelerator.

8. The computing system of claim 1, wherein the source memory is a first activation memory of a first tensor processor unit of the machine learning accelerator and the destination memory is a second activation memory of a second tensor processor unit of the machine learning accelerator.

9. The computing system of claim 1, wherein the source memory is an activation memory of a tensor processor unit of the machine learning accelerator and the destination memory is a shared memory of the machine learning accelerator.

10. A method comprising:
- generating, by a first controller and based on instructions for reading a source tensor from a source memory, source addresses indicating locations in the source memory where portions of the source tensor are stored;
- generating, by a second controller and based on instructions for writing a destination tensor into a destination memory, destination addresses indicating locations in the destination memory where portions of the destination tensor are to be stored;
- receiving, by a direct-memory access agent, a source address generated by the first controller and a destination address generated by the second controller;
- determining, by the direct-memory access agent, a burst size;
- issuing, by the direct-memory access agent, a read request comprising the source address and the burst size to read tensor data from the source memory;
- storing, by the direct-memory access agent, the tensor data into an alignment buffer; and
- issuing, by the direct-memory access agent, a write request comprising the destination address and the burst size to write data from the alignment buffer into the destination memory.

11. The method of claim 10, wherein the instructions for reading the source tensor from the source memory include:
- a source loop instruction to be executed by the first controller, the source loop instruction causing the first controller to iteratively generate the source addresses;
- a source base address indicating a location in the source memory where a first portion of the source tensor is stored; and
- one or more source address increment values, each of the one or more source address increment values associated with a dimension of one or more dimensions comprising the source tensor.

12. The method of claim 11, wherein generating the source addresses comprises:
- receiving, by the first controller, the instructions for reading the source tensor from the source memory; and
- incrementing, using the source loop instruction, the source base address by the one or more address increment values for each dimension of the one or more dimensions.

13. The method of claim 10, wherein the instructions for writing the destination tensor into the destination memory include:
- a destination loop instruction to be executed by the second controller, the destination loop instruction causing the second controller to iteratively generate the destination addresses;
- a destination base address indicating a location in the destination memory where a first portion of the destination tensor is to be stored; and
- one or more destination address increment values, each of the one or more destination address increment values associated with a dimension of one or more dimensions comprising the destination tensor.

14. The method of claim 13, wherein generating the destination addresses comprises:

receiving, by the second controller, the instructions for writing the destination tensor into the destination memory; and incrementing, using the destination loop instruction, the destination base address by the one or more address increment values for each dimension of the one or more dimensions.

15. The method of claim 10, wherein issuing the write request comprising the destination address and the burst size to write data from the alignment buffer into the destination memory comprises:

shifting, by the direct-memory access agent, the data in the alignment buffer to align with the destination address; and transmitting, by the direct-memory access agent, the data from the alignment buffer to the destination memory in one or more burst transmissions according to the burst size.

16. One or more computer-readable non-transitory storage media embodying software that is operable when executed to:

generate, based on instructions for reading a source tensor from a source memory, source addresses indicating locations in the source memory where portions of the source tensor are stored;

generate, based on instructions for writing a destination tensor into a destination memory, destination addresses indicating locations in the destination memory where portions of the destination tensor are to be stored;

determine a burst size;

issue a read request comprising a source address and the burst size to read tensor data from the source memory;

store the tensor data into an alignment buffer; and issue a write request comprising a destination address and the burst size to write data from the alignment buffer into the destination memory.

17. The media of claim 16, wherein the instructions for reading the source tensor from the source memory include:

a source loop instruction;

a source base address indicating a location in the source memory where a first portion of the source tensor is stored; and one or more source address increment values, each of the one or more source address increment values associated with a dimension of one or more dimensions comprising the source tensor.

18. The media of claim 17, wherein to generate the source addresses, the software is further operable when executed to:

receive the instructions for reading the source tensor from the source memory; and increment, using the source loop instruction, the source base address by the one or more address increment values for each dimension of the one or more dimensions.

19. The media of claim 16, wherein the instructions for writing the destination tensor into the destination memory include:

a destination loop instruction;

a destination base address indicating a location in the destination memory where a first portion of the destination tensor is to be stored; and one or more destination address increment values, each of the one or more destination address increment values associated with a dimension of one or more dimensions comprising the destination tensor.

20. The media of claim 19, wherein to iteratively generate the destination addresses, the software is further operable when executed to:

receive the instructions for writing the destination tensor into the destination memory; and increment, using the destination loop instruction, the destination base address by the one or more address increment values for each dimension of the one or more dimensions.

* * * * *